(12) United States Patent
Feathergill et al.

(10) Patent No.: US 8,898,114 B1
(45) Date of Patent: Nov. 25, 2014

(54) MULTITIER DEDUPLICATION SYSTEMS AND METHODS

(75) Inventors: David Allen Feathergill, Woodstock, IL (US); Jason Mattox, Spring Grove, IL (US)

(73) Assignee: Dell Software Inc., Aliso Viejo, CA (US)

( * ) Notice: Subject to any disclaimer, the term of this patent is extended or adjusted under 35 U.S.C. 154(b) by 0 days.

(21) Appl. No.: 13/218,362

(22) Filed: Aug. 25, 2011

Related U.S. Application Data

(60) Provisional application No. 61/377,658, filed on Aug. 27, 2010.

(51) Int. Cl.
G06F 7/00 (2006.01)
G06F 17/00 (2006.01)
G06F 17/30 (2006.01)

(52) U.S. Cl.
CPC .............................. *G06F 17/30159* (2013.01)
USPC .......................................... 707/648; 707/653

(58) Field of Classification Search
CPC ..................... G06F 17/30156; G06F 17/30159
USPC .................................................. 707/648, 653
See application file for complete search history.

(56) References Cited

U.S. PATENT DOCUMENTS

| | | |
|---|---|---|
| 4,130,867 A | 12/1978 | Bachman et al. |
| 4,648,031 A | 3/1987 | Jenner |
| 4,665,520 A | 5/1987 | Strom et al. |
| 5,222,235 A | 6/1993 | Hintz et al. |
| 5,297,279 A | 3/1994 | Bannon et al. |
| 5,325,505 A | 6/1994 | Hoffecker et al. |
| 5,333,314 A | 7/1994 | Masai et al. |
| 5,414,650 A | 5/1995 | Hekhuis |
| 5,422,979 A | 6/1995 | Eichfeld et al. |
| 5,423,037 A | 6/1995 | Hvasshovd |
| 5,455,945 A | 10/1995 | VanderDrift |
| 5,530,855 A | 6/1996 | Satoh et al. |
| 5,551,020 A | 8/1996 | Flax et al. |
| 5,553,303 A | 9/1996 | Hayashi et al. |
| 5,596,504 A | 1/1997 | Tata et al. |
| 5,596,747 A | 1/1997 | Katabami et al. |
| 5,634,052 A | 5/1997 | Morris |
| 5,640,561 A | 6/1997 | Satoh et al. |
| 5,655,081 A | 8/1997 | Bonnell et al. |

(Continued)

OTHER PUBLICATIONS

"Data Deduplication Deep Dive, How to Put Data Storage on a Diet", InfoWorld, Mar. 2010, in 5 pages.

(Continued)

*Primary Examiner* — Mariela Reyes
(74) *Attorney, Agent, or Firm* — Winstead PC

(57) ABSTRACT

Multitier deduplication can reduce the amount of bandwidth and storage resources used during deduplication. In certain embodiments, the system can determine if a data block is stored in a first archive data storage. If so, the system can skip the data block. If not, the system can determine if the data block is stored or identified in a second archive data storage. In various implementations, the first archive data storage can be local to the system and the second archive data storage can be a global archive that may be remote from the system. The system can create a map of a plurality of backups stored at the first archive enabling the system to quickly check multiple archives. The multitier data deduplication can filter out inactive data blocks during or before performing the deduplication process.

20 Claims, 9 Drawing Sheets

(56) References Cited

U.S. PATENT DOCUMENTS

| | | |
|---|---|---|
| 5,664,186 A | 9/1997 | Bennett |
| 5,721,915 A | 2/1998 | Sockut et al. |
| 5,758,356 A | 5/1998 | Hara et al. |
| 5,761,667 A | 6/1998 | Koeppen |
| 5,761,677 A | 6/1998 | Senator et al. |
| 5,774,717 A | 6/1998 | Porcaro |
| 5,778,377 A | 7/1998 | Marlin et al. |
| 5,778,392 A | 7/1998 | Stockman et al. |
| 5,796,934 A | 8/1998 | Bhanot et al. |
| 5,799,322 A | 8/1998 | Mosher, Jr. |
| 5,822,780 A | 10/1998 | Schutzman |
| 5,848,416 A | 12/1998 | Tikkanen |
| 5,893,924 A | 4/1999 | Vakkalagadda |
| 5,933,818 A | 8/1999 | Kasravi et al. |
| 5,933,820 A | 8/1999 | Beier et al. |
| 5,940,832 A | 8/1999 | Hamada et al. |
| 5,943,677 A | 8/1999 | Hicks |
| 5,948,108 A | 9/1999 | Lu et al. |
| 5,951,694 A | 9/1999 | Choquier et al. |
| 5,951,695 A | 9/1999 | Kolovson |
| 5,956,489 A | 9/1999 | San Andres et al. |
| 5,956,504 A | 9/1999 | Jagadish et al. |
| 5,978,594 A | 11/1999 | Bonnell et al. |
| 5,983,239 A | 11/1999 | Cannon |
| 5,990,810 A | 11/1999 | Williams |
| 5,991,761 A | 11/1999 | Mahoney et al. |
| 5,995,958 A | 11/1999 | Xu |
| 6,003,022 A | 12/1999 | Eberhard et al. |
| 6,016,497 A | 1/2000 | Suver |
| 6,026,412 A | 2/2000 | Sockut et al. |
| 6,029,195 A | 2/2000 | Herz |
| 6,067,410 A | 5/2000 | Nachenberg |
| 6,067,545 A | 5/2000 | Wolff |
| 6,070,170 A | 5/2000 | Friske et al. |
| 6,119,128 A | 9/2000 | Courter et al. |
| 6,122,640 A | 9/2000 | Pereira |
| 6,151,607 A | 11/2000 | Lomet |
| 6,157,932 A | 12/2000 | Klein et al. |
| 6,185,699 B1 | 2/2001 | Haderle et al. |
| 6,243,715 B1 | 6/2001 | Bogantz et al. |
| 6,253,212 B1 | 6/2001 | Loaiza et al. |
| 6,289,357 B1 | 9/2001 | Parker |
| 6,314,421 B1 | 11/2001 | Sharnoff et al. |
| 6,343,296 B1 | 1/2002 | Lakhamraju et al. |
| 6,363,387 B1 | 3/2002 | Ponnekanti et al. |
| 6,411,964 B1 | 6/2002 | Iyer et al. |
| 6,460,048 B1 | 10/2002 | Teng et al. |
| 6,470,344 B1 | 10/2002 | Kothuri et al. |
| 6,477,535 B1 | 11/2002 | Mirzadeh |
| 6,499,039 B1 | 12/2002 | Venkatesh et al. |
| 6,519,613 B1 | 2/2003 | Friske et al. |
| 6,523,035 B1 | 2/2003 | Fleming et al. |
| 6,584,474 B1 | 6/2003 | Pereira |
| 6,606,626 B1 | 8/2003 | Ponnekanti |
| 6,631,478 B1 | 10/2003 | Wang et al. |
| 6,671,721 B1 | 12/2003 | Branson et al. |
| 6,681,386 B1 | 1/2004 | Amin et al. |
| 6,691,139 B2 | 2/2004 | Ganesh et al. |
| 6,721,742 B1 | 4/2004 | Uceda-Sosa et al. |
| 6,728,780 B1 | 4/2004 | Hebert |
| 6,834,290 B1 | 12/2004 | Pugh et al. |
| 6,859,889 B2 | 2/2005 | Matsuura et al. |
| 6,907,512 B2 | 6/2005 | Hill et al. |
| 6,950,834 B2 | 9/2005 | Huras et al. |
| 6,959,441 B2 | 10/2005 | Moore |
| 7,065,538 B2 | 6/2006 | Aronoff et al. |
| 7,085,900 B2 | 8/2006 | Inagaki et al. |
| 7,093,086 B1 | 8/2006 | van Rietschote |
| 7,340,486 B1 | 3/2008 | Chapman |
| 7,370,164 B1 | 5/2008 | Nagarkar et al. |
| 7,447,854 B1 | 11/2008 | Cannon |
| 7,461,103 B2 | 12/2008 | Aronoff et al. |
| 7,546,325 B2 | 6/2009 | Kamei et al. |
| 7,610,331 B1 | 10/2009 | Genske et al. |
| 7,657,581 B2 | 2/2010 | Orenstein et al. |
| 7,669,020 B1 | 2/2010 | Shah et al. |
| 7,707,185 B1 | 4/2010 | Czezatke et al. |
| 7,752,487 B1 | 7/2010 | Feeser et al. |
| 7,765,400 B2 | 7/2010 | Costea et al. |
| 7,769,722 B1 | 8/2010 | Bergant et al. |
| 7,805,423 B1 | 9/2010 | Romine et al. |
| 7,844,577 B2 | 11/2010 | Becker et al. |
| 7,849,267 B2 | 12/2010 | Lam et al. |
| 7,895,161 B2 | 2/2011 | Sugimoto et al. |
| 7,925,850 B1 | 4/2011 | Waldspurger et al. |
| 1,016,129 A1 | 6/2011 | Vengerov et al. |
| 8,001,596 B2 | 8/2011 | Wollnik et al. |
| 8,010,495 B1 | 8/2011 | Kuznetzov et al. |
| 8,046,550 B2 | 10/2011 | Feathergill |
| 8,060,476 B1 | 11/2011 | Afonso et al. |
| 8,135,930 B1 | 3/2012 | Mattox et al. |
| 8,166,265 B1 | 4/2012 | Feathergill |
| 8,250,033 B1 | 8/2012 | De Souter et al. |
| 8,286,019 B2 * | 10/2012 | Murase ................. 713/324 |
| 8,335,902 B1 | 12/2012 | Feathergill |
| 8,412,848 B2 | 4/2013 | Therrien et al. |
| 8,464,214 B2 | 6/2013 | Miloushev et al. |
| 8,627,198 B2 | 1/2014 | Martinsen et al. |
| 2003/0145074 A1 | 7/2003 | Penick |
| 2004/0024961 A1 | 2/2004 | Cochran et al. |
| 2004/0030822 A1 | 2/2004 | Rajan et al. |
| 2004/0236803 A1 | 11/2004 | Spiegeleer |
| 2005/0114614 A1 | 5/2005 | Anderson et al. |
| 2005/0278280 A1 | 12/2005 | Semerdzhiev et al. |
| 2006/0005189 A1 | 1/2006 | Vega et al. |
| 2006/0020932 A1 | 1/2006 | Bentz et al. |
| 2006/0155735 A1 | 7/2006 | Traut et al. |
| 2006/0218544 A1 | 9/2006 | Chakraborty et al. |
| 2007/0208918 A1 | 9/2007 | Harbin et al. |
| 2007/0234334 A1 | 10/2007 | Araujo, Jr. et al. |
| 2007/0244938 A1 | 10/2007 | Michael et al. |
| 2008/0082593 A1 | 4/2008 | Komarov et al. |
| 2008/0155208 A1 | 6/2008 | Hiltgen et al. |
| 2008/0177994 A1 | 7/2008 | Mayer |
| 2008/0201414 A1 | 8/2008 | Amir Husain et al. |
| 2008/0244028 A1 | 10/2008 | Le et al. |
| 2008/0244577 A1 | 10/2008 | Le et al. |
| 2008/0250406 A1 | 10/2008 | Carpenter et al. |
| 2009/0007100 A1 | 1/2009 | Field et al. |
| 2009/0089781 A1 | 4/2009 | Shingai et al. |
| 2009/0158432 A1 | 6/2009 | Zheng et al. |
| 2009/0216816 A1 | 8/2009 | Basler et al. |
| 2009/0216970 A1 | 8/2009 | Basler et al. |
| 2009/0240904 A1 | 9/2009 | Austruy et al. |
| 2009/0265403 A1 | 10/2009 | Fukumoto |
| 2009/0300023 A1 | 12/2009 | Vaghani |
| 2010/0030983 A1 | 2/2010 | Gupta et al. |
| 2010/0049930 A1 | 2/2010 | Pershin et al. |
| 2010/0058013 A1 * | 3/2010 | Gelson et al. ................. 711/162 |
| 2010/0070725 A1 | 3/2010 | Prahlad et al. |
| 2010/0076934 A1 | 3/2010 | Pershin et al. |
| 2010/0077165 A1 | 3/2010 | Lu et al. |
| 2010/0088277 A1 * | 4/2010 | Rao et al. ...................... 707/637 |
| 2010/0115332 A1 | 5/2010 | Zheng et al. |
| 2010/0122248 A1 | 5/2010 | Robinson et al. |
| 2010/0228913 A1 | 9/2010 | Czezatke et al. |
| 2010/0235813 A1 | 9/2010 | Manczak et al. |
| 2010/0235831 A1 | 9/2010 | Dittmer |
| 2010/0235832 A1 | 9/2010 | Rajagopal et al. |
| 2010/0257331 A1 | 10/2010 | Frank |
| 2010/0262585 A1 | 10/2010 | Rosikiewicz et al. |
| 2010/0262586 A1 | 10/2010 | Rosikiewicz et al. |
| 2010/0262802 A1 | 10/2010 | Goebel et al. |
| 2010/0293140 A1 | 11/2010 | Nishiyama |
| 2010/0306412 A1 | 12/2010 | Therrien et al. |
| 2011/0035358 A1 | 2/2011 | Naik |
| 2011/0047340 A1 | 2/2011 | Olson et al. |
| 2011/0145199 A1 | 6/2011 | Prasad Palagummi |
| 2011/0153697 A1 | 6/2011 | Nickolov et al. |
| 2011/0154325 A1 | 6/2011 | Terasaki |
| 2011/0225122 A1 | 9/2011 | Denuit et al. |
| 2012/0084598 A1 | 4/2012 | Alibakhsh et al. |
| 2012/0109897 A1 | 5/2012 | Janakiraman et al. |
| 2012/0297246 A1 | 11/2012 | Liu et al. |

(56) References Cited

U.S. PATENT DOCUMENTS

| | | |
|---|---|---|
| 2013/0007506 A1 | 1/2013 | Jain et al. |
| 2013/0014102 A1 | 1/2013 | Shah |
| 2013/0097599 A1 | 4/2013 | Konik et al. |
| 2013/0185716 A1 | 7/2013 | Yin et al. |
| 2013/0246685 A1 | 9/2013 | Bhargava et al. |

OTHER PUBLICATIONS

"The What, How and Where of Deduplication", Spectra nTier with FalconStor Deduplication, Spectra Logic Corporation, May 2008, in 12 pages.
"Quest SharePlex for Oracle," Brochure, Quest Software, Inc., Nov. 1999, 4 pages.
Space Management and Reorganization: Challenges and Solutions, http://quest.com/white papers/space_manager_wp.doc, published on or around Dec. 21, 1999.
"Top Five Tips for Space Management and Reorganization," believed to be published after Jul. 21, 1998, in 2 pages.
Backup Critic, "File Versus Image Backups," retrieved from http://www.backuperitic.com/software-buyer/file-verus-image.html on May 4, 2010, in 3 pages.
Computer Associates, "Platinum OnlineReorg Technical Overview, OnlineReorg", http://platinum.com/products/custstor/tsreorg.htm, 5 pages downloaded on Nov. 30, 1999.
Computer Associates, "Platinum Tsreorg Automates Tablespace Reorganizations, Customer Story", http://platinum.com/products/custstor/tsreorg.htm, 2 pages downloaded on Nov. 30, 1999.
Computer Associates, "ProVision Tsreorg for Oracle, Brochure, Database Utilities Tsreorg for Oracle", http://platinum.com/products/custstor/tsreorg.htm, 4 pages downloaded on Nov. 30, 1999.
Computer Associates, "Rapid Reorg for DB2 for OS/390, Brochure", http://platinum.com/products/custstor/tsreorg.htm, 3 pages downloaded on Nov. 30, 1999.
Data Sheet: Data Protection, "Symantec NetBackup 7, The Symantec NetBackup Platform: Complete protection for your information-driven enterprise," Symantec Corporation, Dec. 2009, in 8 pages.
EMC Deduplication Frequently Asked Questions, http://www.datadomain.com/resources/faq.html, downloaded Jun. 7, 2011, 4 pages.
Harley Stagner, "Aligning disk partitions to boost virtual machine performance", Vmware Management, Migration and Performance, http://searchvmware.techtarget.com/tip/0,289483,sid179_gci1344730_mem1,00.html, Jan. 28, 2009, pp. 1-5.
Jeff Graves, "Partition Alignment", ORCS Web Team Blog, http://www.orcsweb.com/blog, Sep. 14, 2009, pp. 1-2.
Jin, Keren et al.,"The Effectiveness of Deduplication on Virtual Machine Disk Images", SYSTOR 2009, May 2009, in 12 pages.
John Willemse, "VMware disk alignment VMDK settings and align at the 64k boundary blogSphere bug desktop enterprise microsoft server vist . . . ", Planet Lotus, http://planetlotus.org/profiles/john-willemse_49586, Apr. 30, 2009, pp. 1-5 (of 44).
Joseph Pagano, paper on Microsoft Exchange Disaster Recovery Planning, document version 3.00, 1996, in 39 pages.
K. Loney, et al., "Oracle8i, DB Handbook," Oracle Press, 2000, p. 20.
Kleo Bare Metal Backup, Wikipedia, retrieved from http://en.wikipedia.org/wiki/Kleo_Bare_Metal_Backup on Apr. 14, 2010, in 3 pages.
L. Leverenz, et al., "Oracle8i Concepts," Oracle Corp., vol. 2, Release 8.1.5, 1999, p. 20-3.
Laverick, Mike, "VMware ESX 3.x Server and VirtualCenter 2.x (GA Build Eval) Service Console Guide," Document Ver. 1.2, RTFM Education, downloaded Dec. 17, 2008, in 73 pages.
Massiglia, Paul, "Block-Level Incremental Backup", Veritas Software Corporation, Feb. 2000, in 13 pages.
Microsoft TechNet, Windows Server 2003, retrieved from http://technet.microsoft.com/enus/library/cc706993(WS.10,printer).aspx on Aug. 3, 2011, in 6 pages.
MSDN, Overview of Processing a Backup Under VSS, retrieved from http://msdn.microsoft.com/en-us/library/aa384589(d=printer,v=VS.85).aspx on Aug. 3, 2011, in 5 pages.
Oracle: Introduction to PL/SQL, Power Point Presentation Regarding Triggers, slides 4, 6-7, 11, 14-17, 28, and 51, http://training.ntsource.com/dpec/COURSES/PL1/plc011.htm, 10 pages downloaded on Oct. 20, 2000.
Tom Hirt, "Importance of Disk Alignment in VMware", VMware Disk Alignment—How-to Align VMware Partitions—Disk, Alignment, Vmfs, Vmdk, Esx, Apr. 9, 2009, pp. 1-15.
U.S. Appl. No. 12/762,162, filed Apr. 16, 2010, titled "Block Status Mapping System for Reducing Virtual Machine Backup Storage", in 29 pages.
Veeam Technology Overview, "The New Standard for Data Protection," Veeam Software, Apr. 2010, in 2 pages.
Veritas NetBackup for VMware Adminstrator's Guide, UNIX, Windows, and Linux, Release 6.5.4, Symantec Corporation, 2009, in 66 pages.
VMWARE, "Recommendations for Aligning VMFS Partitions", VMware Infrastructure 3, VMware Performance Study, Feb. 2009, pp. 1-10.
VMWARE, Inc., "VMware Virtual Machine File System: Technical Overview and Best Practices", A VMware Technical White Paper, http://www.vmware.com/support/, 2007, Issue Version 1.0, pp. 1-19.
Armstrong, Ben, "How Do I Fix a Corrupted Virtual Hard Disk?", Virtual PC Guy's Blog, Jan. 7, 2009, in 4 pages.
Microsoft Corporation Technet, "Compacting Dynamically Expanding Virtual Hard Disks", retrieved Feb. 6, 2012, in 2 pages.
Microsoft Corporation Technet, "To Compact a Dynamically Expanding Virtual Hard Disk", retrieved Feb. 6, 2012, in 1 page.
Microsoft Corporation, "Microsoft Windows XP—Compact", Command-line reference A-Z, retrieved Feb. 6, 2012, in 2 pages.
Naik, Dilip, "Virtual Machine Storage—often overlooked optimizations", 2010 Storage Developer Conference, Storage Networking Industry Association, Sep. 2010, in 21 pages.
Russinovich, Mark, "SDelete v1.6", Windows Sysinternals, published Sep. 1, 2011, in 3 pages.
U.S. Appl. No. 13/368,240, filed Feb. 7, 2012, titled "Systems and Methods for Compacting a Virtual Machine File", in 44 pages.
Afonso, Delano Xavier, U.S. Appl. No. 13/764,011, filed Feb. 11, 2013.
U.S. Appl. No. 13/850,164, filed Mar. 25, 2013, Feathergill.

\* cited by examiner

MULTITIER DEDUPLICATION SYSTEMS AND METHODS

RELATED APPLICATION

This application claims the benefit of priority under 35 U.S.C. §119(e) of U.S. Provisional Patent Application No. 61/377,658, filed on Aug. 27, 2010, and entitled "MULTITIER DEDUPLICATION SYSTEMS AND METHODS," the disclosure of which is hereby incorporated by reference in its entirety.

BACKGROUND

Many companies take advantage of virtualization solutions to consolidate several specialized physical servers and workstations into fewer servers running virtual machines. Each virtual machine can be configured with its own set of virtual hardware (e.g., processor, memory, ports, and the like) such that specialized services that each of the previous physical machines performed can be run in their native operating system. For example, a virtualization layer, or hypervisor, can allocate the computing resources of one or more host servers into one or more virtual machines and can further provide for isolation between such virtual machines. In such a manner, the virtual machine can be a representation of a physical machine by software.

In many virtual machine implementations, each virtual machine is associated with at least one virtual machine disk or image located in one or more files in a data store. The virtual machine image can include files associated with a file system of a guest operating system. The virtual machine image can be copied, moved, backed up, or the like, similar to a general data file.

SUMMARY

This disclosure describes examples of systems and methods for deduplicating a backup archive. In certain embodiments, a system can access one or more backup block directories associated with one or more backup archives at an archive data store. The one or more block directories can include fingerprints of data blocks associated with the one more archives. Further, at least one of the one or more archives is associated with a data store. The system can create a composite block map based on the one or more block directories. This composite block map can include fingerprints of each data block stored at the archive data store. The system can access one or more data blocks from the data store. For each of the one or more data blocks, the system can create a fingerprint. Further, the system can determine whether the fingerprint exists in the composite block map. In response to determining that the fingerprint does not exist in the composite block map, the system can determine whether the fingerprint exists in a global deduplication data store. In response to determining that the fingerprint does not exist in the global deduplication data store, the system can back up the data block as part of a target archive at the archive data store. Further, the system can store the fingerprint associated with the data block storage at a target block directory associated with the target archive.

In certain embodiments, if the system determines that the fingerprint exists in the composite block map, the system can avoid backing up the data block associated with the fingerprint. As a result, in certain embodiments, the system can use less resources deduplicating a backup archive by reducing the number of queries to the global deduplication data store.

For purposes of summarizing the disclosure, certain aspects, advantages and novel features of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

I. Introduction

Figure 1:
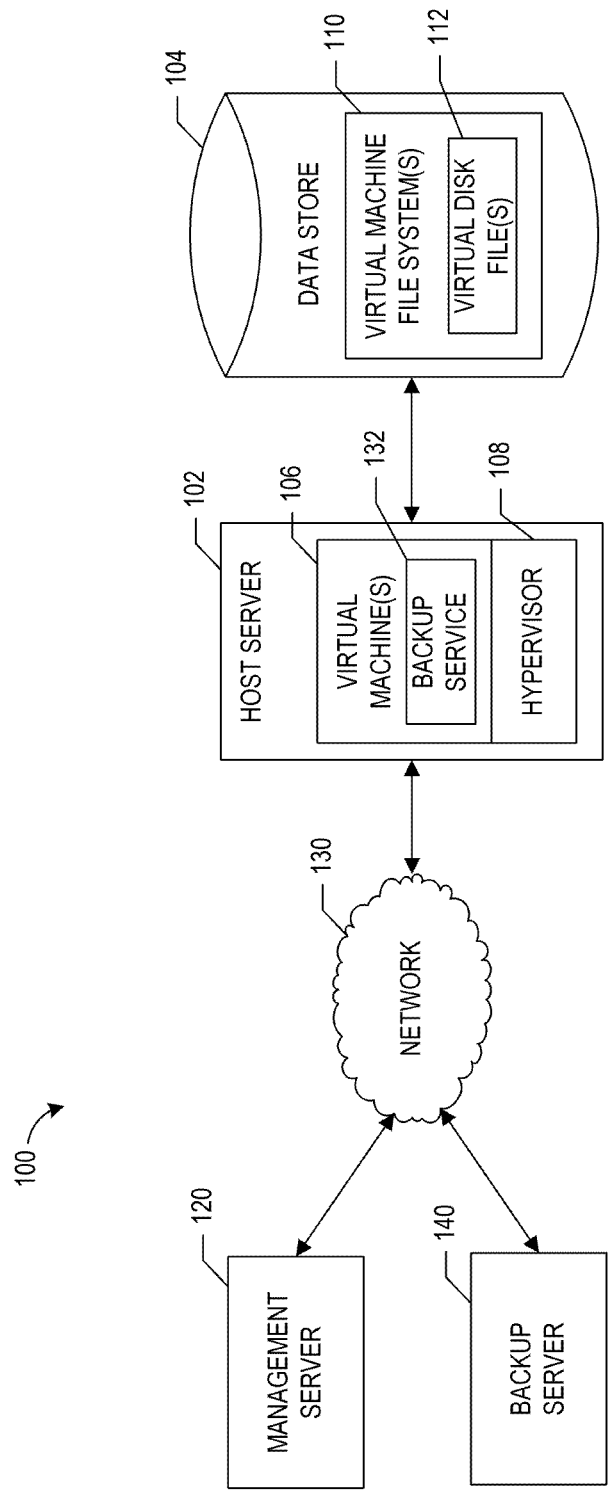
FIG. 1 illustrates an embodiment of a system for performing backup operations in a virtual computing environment.

Virtual machine images often contain a large percentage of white space, which includes empty blocks (zero blocks). A backup of an entire virtual machine image therefore stores the white space together with any active and deleted blocks, wasting storage space and backup time. Some solutions determine which blocks of a virtual machine image are zero blocks and then back up only the active and deleted blocks. This backup approach is called zero handling. A drawback of zero handling is that a full scan of the blocks is performed to determine which blocks are the zero blocks. The full scan can take a significant amount of time. Another drawback of this approach is that zero handling fails to account for blocks of a file system that are marked as deleted. Thus, even when accounting for zero blocks, a backup system can still back up a significant amount of irrelevant deleted data, which still results in wasted storage space and backup time.

This disclosure describes systems and methods for programmatically determining the status of blocks in a virtual machine image. In certain embodiments, the system can determine which blocks are active, deleted, zero, or a combination of the same. In certain embodiments, the system advantageously determines block status without scanning some or all the blocks in a virtual machine image. Instead, the system can access metadata in a file system of a virtual machine image to determine the block status. When backing up the virtual machine image, the system can back up active blocks while skipping inactive blocks, including deleted and/or zero blocks. As a result, the system can take less time to back up a virtual machine image, and the resulting backup file or files can consume less storage space.

To prevent data loss in physical and virtual computing systems, organizations generally perform frequent backups. Backups can include full backups, differential backups, and incremental backups. When full backups are performed, all or substantially all of the data in a data store can be archived. A differential backup can be a cumulative backup of all or substantially all changes made since the last full backup. With incremental backups, a first full backup can be performed, followed by a series of one or more incremental backups. Incremental backups can include all or substantially all changes made since the last backup of any type.

Backing up data can consume significant storage resources as well as network bandwidth as data is transferred from a host to a backup server. To reduce the storage and network burdens of backup operations, deduplication is often performed on backup sets. In general, deduplication can include a process of detecting and/or removing duplicate data. Deduplication can run before, during, or after backup operations are performed. The first time a deduplication system sees a file or a chunk of a file, that data element can be identified, for example, by hashing the data. The hashed data may then be stored in an index. As each new chunk of data gets hashed, it can be compared with the existing hashes in the index. If the hash is already in the index, this means that the chunk of data is a duplicate and does not need to be stored again. If the hash is not already in the index, the hash of the new data can be added to the index. In this manner, duplicate files or portions of files may not be backed up, thereby reducing backup storage and network bandwidth.

A problem with some existing deduplication systems is that the database used to maintain the hash index can be computationally costly to access. Frequent and large backups can result in many hash entries being added to the database, slowing down access speeds. Such a database may also often be accessible over a network link, and access time can therefore be limited by the network bandwidth. Further, some relational database management systems are not optimized for the tasks of frequent rapid lookups of the hash data.

This disclosure describes examples of systems and methods for multitier deduplication which can reduce the use of bandwidth and storage resources. In certain embodiments, the system can determine if a data block is backed up or stored in a first archive data storage. For example, the first archive data storage may be local to the system. If the data block is backed up or stored in the first archive data storage, the system can skip the data block. If the system determines that the data block is not backed up in the first archive data storage, the system can determine if the data block is stored or identified in a second archive data storage. In various implementations, the second archive data storage may be local or remote to the system, and the second archive data storage may be a global archive. By first checking the first (e.g., local) archive data storage, the system can reduce the frequency of accesses to the second (e.g., remote, global) archive, which can be slower and more resource intensive to access. In certain embodiments, the system can create a map of a plurality of incremental and full backups stored at the first archive data storage. This can enable the system to quickly check multiple archives located at the first archive data storage. In certain embodiments, the multitier data deduplication can filter out inactive data blocks before performing the deduplication process. Advantageously, in certain embodiments, filtering out inactive data blocks speeds up the deduplication process by reducing the number of data blocks to check.

II. Example Backup System

FIG. 1 depicts an embodiment of a system 100 for performing backup operations in a virtual computing environment. In general, the backup system 100 provides a tool for backing up virtual machine disk files without backing up a significant amount of deleted or empty data. As such, in certain embodiments, the backup system 100 can perform backups faster and with less storage consumption than currently-available backup systems.

As shown in FIG. 1, the backup system 100 includes a host server 102 in communication with a data store 104. In certain embodiments, the host server 102 includes one or more computing devices configured to host one or more virtual machines 106 executing on top of a hypervisor 108. In certain embodiments, the hypervisor 108 decouples the physical hardware of the host server 102 from the operating system(s) of the virtual machine(s) 106. Such abstraction allows, for example, for multiple virtual machines 106 with different operating systems and applications to run in isolation or substantially in isolation on the same physical machine.

The hypervisor 108 includes a virtualization platform that allows for multiple operating systems to run on a host computer at the same time. For instance, the hypervisor 108 can include a thin piece of software that runs directly on top of the hardware platform of the host server 102 and that virtualizes resources of the machine (e.g., a native or "bare-metal" hypervisor). In such embodiments, the virtual machine(s) 106 can run, with their respective operating systems, on the hypervisor 108 without the need for a host operating system. Examples of such bare-metal hypervisors can include, but are not limited to, ESX SERVER by VMware, Inc. (Palo Alto, Calif.), XEN and XENSERVER by Citrix Systems, Inc. (Fort Lauderdale, Fla.), ORACLE VM by Oracle Corporation (Redwood City, Calif.), HYPER-V by Microsoft Corporation (Redmond, Wash.), VIRTUOZZO by Parallels, Inc. (Switzerland), or the like.

In yet other embodiments, the host server 102 can include a hosted architecture in which the hypervisor 108 runs within a host operating system environment. In such embodiments, the hypervisor 108 can rely on the host operating system for device support and/or physical resource management. Examples of such hosted hypervisors can include, but are not limited to, VMWARE WORKSTATION and VMWARE SERVER by VMware, Inc., VIRTUAL SERVER by Microsoft Corporation, PARALLELS WORKSTATION by Parallels, Inc., or the like.

In certain embodiments, each virtual machine 106 includes a guest operating system and associated applications. In such embodiments, the virtual machine 106 accesses the resources (e.g., privileged resources) of the host server 102 through the hypervisor 108. At least some of the machines can also include a backup service 132 in certain embodiments, which can assist with backup operations, as described below.

The host server 102 communicates with the data store 104 to access data stored in one or more virtual machine files. For instance, the data store 104 can include one or more virtual machine file systems 110 that maintain virtual disk files or virtual machine images for some or all of the virtual machines 106 on the host server 102. In certain embodiments, the virtual machine file system 110 includes a VMWARE VMFS cluster file system provided by VMware, Inc. In such embodiments, the VMFS cluster file system enables multiple host servers (e.g., with installations of ESX server) to have concurrent access to the same virtual machine storage and provides on-disk distributed locking to ensure that the same virtual machine is not powered on by multiple servers at the same time. In other embodiments, the virtual machine file system 110 is stored on the host server 102 instead of in a separate data store.

The data store 104 can include any physical or logical storage for holding virtual machine files. The data store 104 can exist on a physical storage resource, including one or more of the following: local disks (e.g., local small computer system interface (SCSI) disks of the host server 102), a disk array, a storage area network (SAN) (e.g., fiber channel), an iSCSI disk area, network attached storage (NAS) arrays, network file system (NFS), or the like. In certain embodiments, the virtual machine(s) 106 uses a virtual disk file 112 or virtual machine image residing on the data store 104 to store its operating system, program files, and other data associated with its activities.

The backup system 100 further includes a management server 120 in communication with the host server 102 over a network 130. In certain embodiments, the management server 120 includes one or more computing devices. The management server 120 can coordinate the backup operations of the virtual machine disk files 112 through the host server 102. In one embodiment, the management server 120 causes the backup service 132 of the virtual machine 106 to perform certain backup operations. For example, the backup service 132 can perform shadow copy or snapshot operations, such as are described in U.S. application Ser. No. 12/182,364, filed Jul. 30, 2008, titled "Systems and Methods for Performing Backup Operations of a Virtual Machine," the disclosure of which is hereby incorporated by reference in its entirety. In addition, the backup system 100 can include additional features described in U.S. application Ser. No. 12/502,052, filed Jul. 13, 2009, titled "Backup Systems and Methods for a Virtual Computing Environment," the disclosure of which is hereby incorporated by reference in its entirety.

Advantageously, in certain embodiments, the management server 120 analyzes the virtual disk files 112 to identify the status of portions of the virtual disk files 112 to determine whether these portions include active, deleted, and/or zero data. The management server 120 can identify the status of these disk file portions efficiently by accessing metadata within the virtual disk file 112. The management server 120 can then initiate a backup of the active portions of the virtual disk file 112.

The management server 120 analyzes the virtual disk file 112 in certain embodiments outside of the virtual machine 106, for example, outside of a guest operating system of the virtual machine 106. The management server 120 can therefore reduce the impact of backup operations on the virtual machine 106. Alternatively, in certain embodiments, a component operating within the virtual machine 106 can perform this analysis, such as an application executing in the virtual machine 106. For instance, the management server 120 can inject a lightweight binary file into the virtual machine 106 executing on the host. On WINDOWS systems, for example, the management server 120 can inject the binary using Windows Management Instrumentation (WMI) features. The binary file can then analyze the virtual disk file 112. Additional features of the management server 120 are described in greater detail below with respect to FIG. 2.

As further illustrated in FIG. 1, the backup system 100 includes a backup, or target, server 140 for storing backup files, such as a backup of one or more of the virtual disk files 112. As shown, the backup server 140 is coupled to the network 130 and can directly communicate with the management server 120. The management server 120 can cause backups of virtual disk files 112 to be stored in the backup server 140.

As shown, the network 130 provides a wired and/or wireless communication medium between the host server 102, the management server 120 and/or the backup server 140. In certain embodiments, the network 130 includes a local area network (LAN). In yet other embodiments, the network includes one or more of the following: internet, intranet, wide area network (WAN), public network, combinations of the same or the like.

Although the backup system 100 has been described with reference to particular arrangements, other embodiments can comprise more or fewer components. For example, in certain embodiments, the backup system 100 can function without the backup server 140, and backup files can be stored to the data store 104 or a local storage device directly coupled to the management server 120 or host system 102.

In yet other embodiments, the host server 102 can comprise a plurality of servers in a clustered arrangement such that the computing and memory resources of the clustered servers are shared by one or more virtual machines 106. Moreover, in certain embodiments, the backup tool maintained by the management server 120 can instead reside on the host server 102 and/or the backup server 140.

Figure 2:
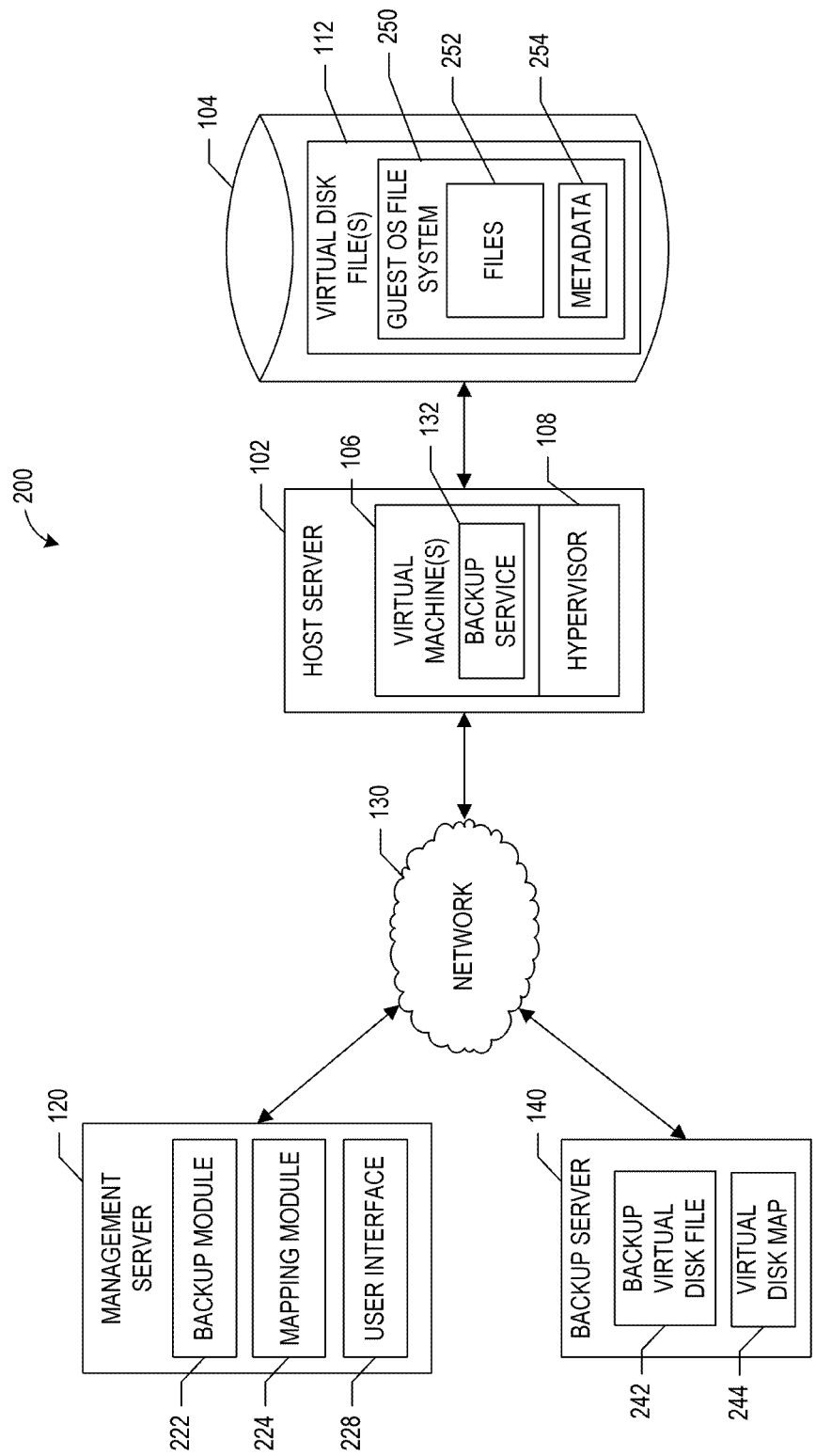
FIG. 2 illustrates an embodiment of another system for performing backup operations in a virtual computing environment.

FIG. 2 illustrates a more detailed embodiment of a backup system 200 for performing storage operations in a virtual computing environment. The backup system 200 includes the features of the backup system 100 of FIG. 1 and further includes additional features. For example, the backup system 200 can back up virtual machine disk files without backing up a significant amount of deleted or empty data.

In the depicted embodiment, the management server 120 includes a backup module 222, a mapping module 224, and a user interface module 228. Each of these modules can be implemented in hardware and/or software. In certain embodiments, the backup module 222 coordinates backup operations of virtual disk files 112 stored in the data store 104. The backup module 222 can perform, for example, full backups, differential backups, incremental backups, or the like. The backup module 222 can coordinate with the backup service 132 within the virtual machine 106 to perform virtual disk snapshots in the manner described in U.S. application Ser. No. 12/182,364, referred to above. However, in some embodiments, the backup module 222 performs backup operations without coordinating with a backup service inside the virtual machine 106.

The mapping module 224 can determine status information about a virtual disk file 112. In the context of VMWARE systems, for instance, the mapping module 224 can access a .VMDK virtual disk file 112. In one embodiment, the backup module 222 invokes the mapping module 224 prior to backing up the virtual disk file 112. Status information determined by the mapping module 224 can include information on which portions of the virtual disk file 112 include active or inactive data. Active data can include data that is currently used by the virtual machine 106. For example, active data can include non-deleted and non-zero data. In contrast, inactive data can include deleted data or zero (empty) data. Some guest operating systems merely mark data as deleted when a user deletes the data, rather than actually erasing the data from storage. Thus, the deleted data can include actual data that has been marked as deleted.

The mapping module 224 can determine the status information about the virtual disk file 112 by accessing a guest operating system file system 250 stored within the file 112. The file system 250 includes files 252, such as guest operating system files, application files, user documents, and so on. Metadata 254 in the file system 250 describes the logical structure of the files 252, including the locations of the files in a logical hierarchy such as a directory tree. In addition, the metadata 254 can specify the physical structure of the files 252, such as the locations of the files 252 in the virtual disk file 112, the size of the files 252, and so on.

Different guest operating systems can include different file systems. For example, many WINDOWS operating systems use the NTFS file system, whereas LINUX systems use a different file system. While file systems from different operating systems are implemented differently, most file systems share the common characteristic of using metadata to describe the structure of the files. In certain embodiments, the mapping module 224 can determine status information from many different types of files systems 250.

Advantageously, in certain embodiments, the mapping module 224 accesses the metadata 254 to determine the status information. Accessing the metadata 254 can be faster than scanning (or reading) some or all of the file system 250 to determine status information because the metadata 254 can include a summary or description of the status information. In one embodiment, the metadata 254 for a WINDOWS-based NTFS file system 250 can include a header file called a Master File Table (MFT). The MFT can be organized as a database table or tables, with each row in the table or tables representing one file. Data about the files 252 stored in the MFT can include information such as file permissions, ownership, size, location, and status of data blocks of the file. The mapping module 224 can therefore access the MFT to obtain the status information for portions of the file system. In contrast, the metadata 254 in many LINUX and UNIX-based systems include an inode or vnode for some or all of the files. The inodes (or vnodes) are data structures that can include file permissions, ownership, size, location, and status of data blocks of the file. Thus, in LINUX or UNIX-based systems, the mapping module 224 can access the inodes or vnodes to obtain status information for portions of the file system.

Different implementations of the mapping module 224 can analyze the metadata 254 at different levels of granularity. In one implementation, the mapping module 224 determines the status of storage blocks of the file system 250 from the metadata 254. In another embodiment, the mapping module 224 determines the status of the files 252 of the file system 250. In yet another embodiment, the mapping module 224 determines the status of directories of the file system 250. For ease of illustration, the remainder of this specification will refer to determining the status of blocks in the file system 250. However, it should be understood that the various features described herein can apply to any type of metadata mapped by the mapping module 224.

Advantageously, in certain embodiments, the mapping module 224 can store the status information about blocks (or other storage units) in a virtual disk map 244 on the backup server 140 or on another device (e.g., in a memory). The virtual disk map 244 can be a data structure or the like that includes some indication of the status of some or all of the blocks in the file system 250. The virtual disk map 244 can advantageously consume far less storage than the data in the virtual disk file 112 because the map 244 represents the data but does not include the actual data. For example, the virtual disk map 244 can be a bitmap, a bytemap, or some other data structure. Various features of the virtual disk map 244 will be described in greater detail below with respect to FIGS. 4 and 5.

When backing up the virtual disk file 112, the backup module 222 can consult the virtual disk map 244 to determine which blocks of the file system 250 are active or inactive. The backup module 222 can then save the active blocks in a backup virtual disk file 242. An embodiment of a backup process used by the backup module 222 is described below with respect to FIG. 3.

The user interface module 228 of the management server 120 can provide functionality for users to control settings of the backup module 222 and/or the mapping module 224. For instance, the user interface module 228 can provide a scheduling user interface that allows an administrator to schedule backups of the virtual disk file 112. In one embodiment, the user interface module 228 also provides an interface to enable or disable the functions of the mapping module 224. An administrator may wish to disable the mapping module 224 because in some embodiments undelete operations cannot be performed on the backup virtual disk file 242 when deleted blocks are not saved in the file 242. The user interface module 228 can also allow an administrator to enable some functionality of the mapping module 224 while disabling others. For example, a user interface might allow an administrator to enable zero block removal to reduce backup size while disabling deleted block removal to allow for undelete operations.

III. Example Backup Process

Figure 3:
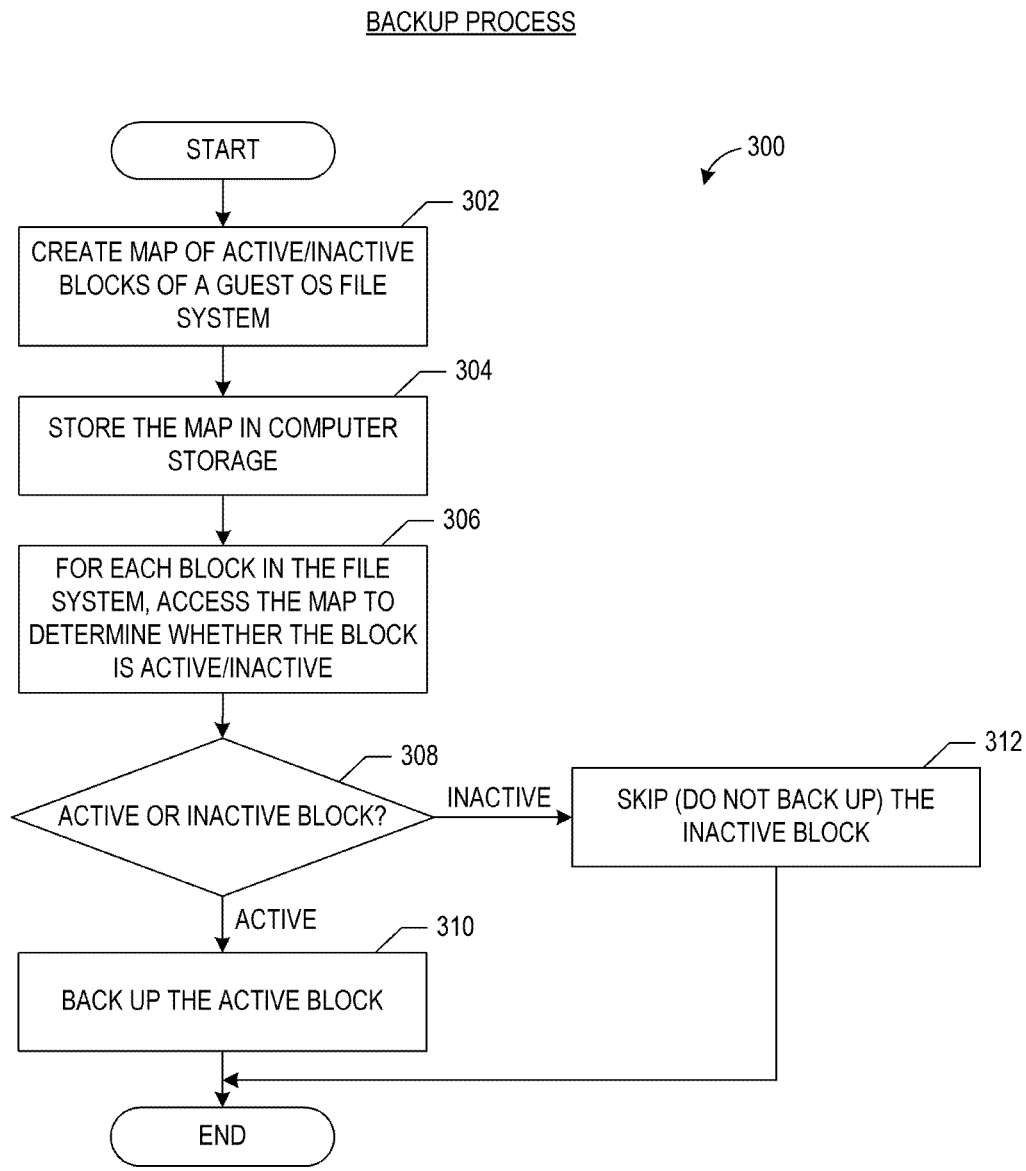
FIG. 3 illustrates an embodiment of a backup process.

FIG. 3 illustrates an embodiment of a backup process 300 for efficiently backing up a virtual machine image. The backup process 300 can be implemented by the systems 100 or 200 described above. For example, the backup process 300 can be implemented by the management server 120, or more specifically, the backup and mapping modules 222, 224 of the management server 120. In certain embodiments, the backup process 300 performs virtual machine image backups more efficiently than currently-available backup solutions.

At state 302, a map of active and/or inactive blocks of a guest operating system file system are created. The map created can be the virtual disk map 244 described above with respect to FIG. 2 and can be created by the mapping module 224. The map can include an indication of which blocks are active, which blocks are inactive, or both. Further, inactive blocks can be broken down to include deleted blocks and zero blocks, which can be separately indicated in the map. The map is stored in computer storage at state 304, for example, by the mapping module 224. The mapping module 224 can persist the map or can store the map in memory (see, e.g., FIG. 4).

For some or all of the blocks in the file system, at state 306, the map is accessed to determine whether the block or blocks are active or inactive. In one embodiment, state 306 is implemented by the backup module 222 at the start of a backup operation. At decision state 308, it is determined whether the block is active or inactive. The backup module 222 can access a value for the block stored in the map, for instance, which indicates whether the block is active or inactive. If the block is active, the block is backed up at state 310. Otherwise, the block is skipped (not backed up) at state 312. In another embodiment, the active blocks are backed up at one time, for example, as one backup operation, instead of backing up individual active blocks.

To illustrate the potential benefits of the backup process 300, an example virtual machine image might include 70 GB of zero blocks, 20 GB of active blocks, and 10 GB of deleted blocks. A traditional backup process without zero or deleted block handling would create a backup file of 70+20+10=100 GB (or somewhat smaller with file compression). With zero handling, the backup file would be 20+10=30 GB (or smaller with compression). However, applying the backup process 300, the backup file size would be 20 GB because both zeros and deleted blocks are skipped by the backup process 300. This file can also be compressed to further reduce storage consumption.

In addition, the backup process 300 can still provide benefits even if the example above were changed to include 70 GB of zero blocks, 20 GB of active blocks, and 0 GB of deleted blocks. While the size of the backup file would be the same or approximately the same whether using zero handling or the process 300, the speed of the backup process 300 can be greater than a zero handling process. The speed increase can be due to the process 300 determining which blocks are zeros more quickly than a traditional zero handling process, which scans all the blocks to determine where the zero blocks are. Techniques for rapidly detecting zeros, deleted blocks, and active blocks are described below with respect to FIG. 4.

IV. Example Block Mapping

Figure 4:
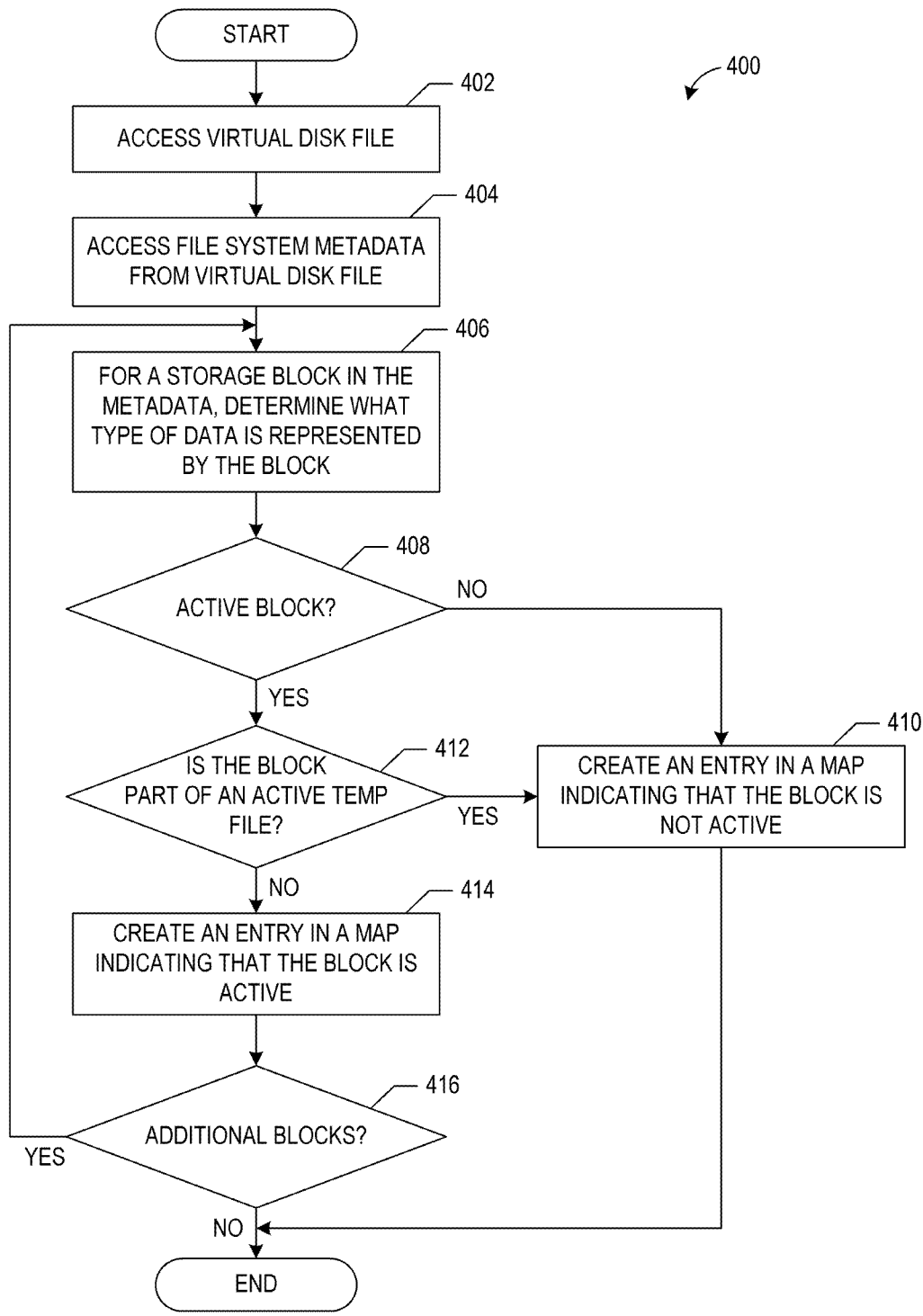
FIG. 4 illustrates an embodiment of a block mapping process.

FIG. 4 illustrates an embodiment of a block mapping process 400 for identifying active and inactive blocks in a virtual machine image. The block mapping process 400 can be implemented by the systems 100 or 200 described above. For example, the block mapping process 400 can be implemented by the management server 120, or more specifically, the mapping module 224 of the management server 120. In certain embodiments, the mapping module 224 efficiently maps block status to a map data structure.

At state 402, a virtual disk file is accessed, and file system data is accessed from the virtual disk file at state 404. In one embodiment, the mapping module 224 directly accesses the metadata in the virtual disk file. For example, the mapping module 224 can access a Master Boot Record (MBR) in the virtual disk file, which is typically in the same location for most virtual disk files (such as within the first several bytes of the file). The mapping module 224 can determine the location of the file system data from the MBR. For NTFS file systems, for example, the MFT metadata file is at a certain offset in the MBR. Thus, once the mapping module 224 has located the file system, the mapping module 224 can access the MFT at the expected location.

In another embodiment, the mapping module 224 indirectly obtains access to the virtual disk file by calling an application programming interface (API) provided, for example, by a virtual machine vendor. For example, in VMWARE virtual machine environments, such an API exists for accessing virtual disk file data. The API can further include functionality for accessing the contents of the virtual disk file, including the file system metadata. This indirect approach to accessing metadata can be useful when the mapping module 224 is implemented in a different file system than the virtual disk file. For instance, if the mapping module 224 is implemented in a WINDOWS file system but the virtual disk file is formatted for the LINUX file system, an API can allow the mapping module 224 to read the LINUX-formatted virtual disk file.

At state 406, for a storage block in the metadata, it is determined what type of data is represented by the block. As described above, the mapping module 224 can determine whether a block contains active, deleted, or zero data. At decision state 406, it is determined whether the block is active. In one embodiment, an active block is any block that contains a portion of active data, however small. Many file systems use a standard block size for partitioning data storage, such as 4 kB. A file system might mark a 4 kB (or other size) block as active even if that active data in the block includes a tiny fraction of the full block size. Thus, even though the backup processes described herein can avoid backing up a substantial amount of deleted data, some deleted data may still be saved in a backup process.

In some embodiments, the mapping module 224 maps a plurality of file system blocks to a single status bit, byte, or the like. For instance, instead of mapping each 4 kB block in a file system to a single status bit (e.g., representing active or deleted), the mapping module 224 can map 256 file system blocks to a single status bit if any of the 256 blocks have active data. If each of the file system blocks is 4 kB large, the mapping module 224 can therefore equivalently map 1 MB of file system data (256×4 kB) to a single status bit. In another embodiment, the mapping module 224 can map 64 file system blocks to a single status bit if any of the 64 blocks have active data. If each of the file system blocks is 4 kB large, the mapping module 224 can then equivalently map 256 kB of file system data (64×4 kB) to a single status bit. Other mapping sizes can be chosen.

In one embodiment, the mapping size is chosen to optimize or otherwise improve the performance of compression algorithms employed by the backup module 222 when compressing the backup virtual disk file 242. Some compression algorithms, when used as an in-line process (e.g., in-line with a backup process) take less processing time when using smaller mapping sizes, whereas others take less time when using larger mapping sizes. Using a larger mapping size can result in storing more deleted data at the possible beneficial tradeoff of reducing compression processing time. The mapping module 224 can automatically adjust the mapping size used based at least partly on the compression algorithm selected.

If the block is not active, an entry is created in a map to indicate that the block is not active at state 410. Otherwise, it is further determined at decision state 412 whether the block is part of an active temporary file. If the block is part of an active temporary file, the block is active because it does not contain deleted data. However, to save backup storage space, in certain embodiments, an entry is created in a map to indicate that the temporary file block is not active at state 410. Examples of temporary files include virtual memory files (e.g., pagefile.sys in WINDOWS), system sleep or hibernate state files (such as hiberfile.sys in WINDOWS), temporary Internet files, and the like. An option to skip (e.g., mark as inactive) or to not skip temporary files can be provided by the user interface module 228 described above.

If the block is not part of a temporary file, an entry is created in the map indicating that the block is active at state 414. It is then determined whether additional blocks are left in the metadata to analyze at decision state 416. If so, the block mapping process 400 loops back to state 406. Otherwise, the block mapping process 400 ends.

The mapping process 400 can be used in conjunction with other systems that provide zero handling. For instance, the mapping process 400 can be applied as a filter to the output of a zero handling system. An example zero handling system provided by VMWARE is the Change Block Tracking (CBT) system. In one embodiment, the backup module 222 can use the CBT system to obtain information about zero blocks. The CBT can perform a full file system scan to identify and map the zero blocks. Thereafter, the mapping module 224 can apply the process 400 to identify deleted blocks in the machine image. The mapping module 224 can modify the map provided by the CBT system to indicate the locations of deleted blocks.

It should be noted that in certain embodiments, the mapping module 224 stores the map in memory instead of persisting the map to disk storage. In another embodiment, the mapping module 224 does not create a map data structure.

Instead, the mapping module 224 can determine whether a block is active, deleted, and/or zero and provide an indication of this determination to the backup module 222 (e.g., through memory). The backup module 222 can then back up the referenced block. The mapping module 224 can then examine the next block, followed by the backup module 222 backing up the next block, and so on. Thus, the determination of active, deleted, and/or zero blocks can be performed in-line with backup operations.

Moreover, in certain embodiments, the mapping module 224 can map the virtual disk file 112 from outside of the virtual machine 106, for example, outside of a guest operating system of the virtual machine 106. The mapping module 224 can therefore reduce the impact of mapping operations on the virtual machine 106. The mapping module 224 and/or the backup module 222 can also facilitate obtaining a more complete picture of the virtual disk file 112 because the mapping module 224 and/or the backup module 222 can execute outside of the virtual machine. In addition, in some embodiments, the backup module 222 performs backup operations from outside of the virtual machine 106. In other embodiments, the mapping module 224 is a process running in the virtual machine and therefore maps the file system from within the virtual machine 106. In one such embodiment, the mapping module 224 can access an operating system API to determine the location of the metadata and access the metadata. The backup module 222 can also be a process running in the virtual machine 106 (e.g., as a volume shadow copy service). In another embodiment, the mapping module 224 can run inside of the virtual machine 106 while the backup module 222 runs outside, or vice versa.

Figure 5:
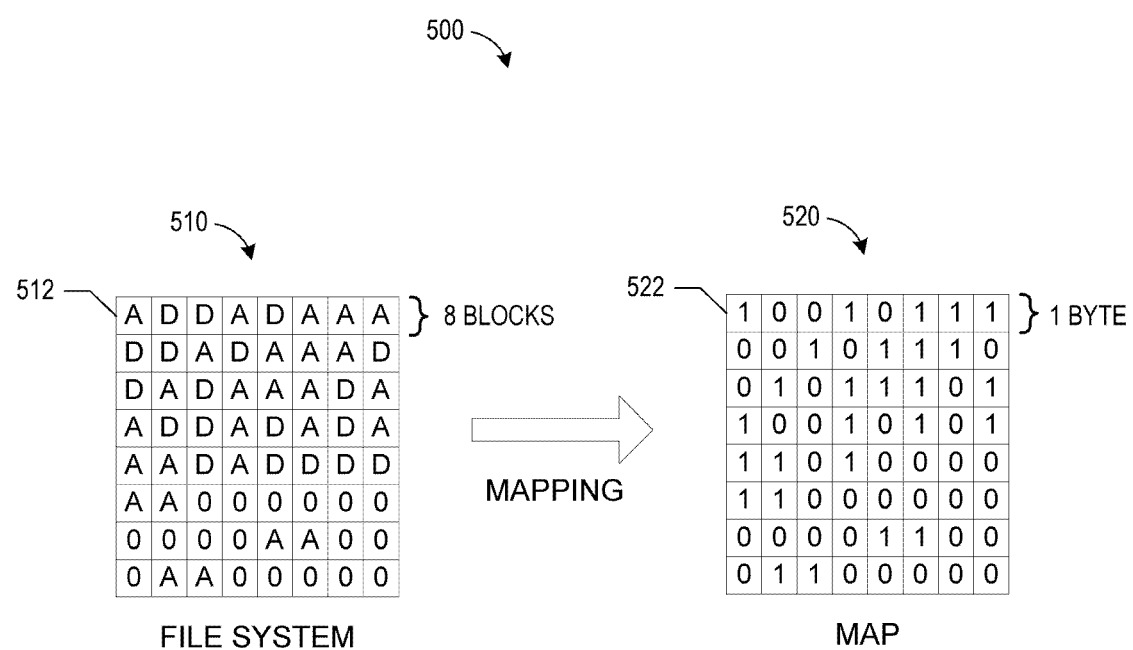
FIG. 5 illustrates an example mapping that can be performed by the block mapping process of FIG. 4.

FIG. 5 illustrates a conceptual example of a mapping 500 that can be performed by the block mapping process 400 of FIG. 4. A portion of a file system 510 is represented by a plurality of blocks 512. The blocks 512 are marked with an 'A', 'D' or '0' character to represent active, deleted, or zero (empty) data, respectively. Some or all of the blocks can represent a particular size or chunk of data; 1 Mb block sizes are used in some NTFS file system implementations, for example.

Some or all of the blocks 512 can be mapped by the block mapping process 400 to a corresponding unit 522 of a map 520. In the depicted embodiment, the map 520 is a bitmap, and each unit 522 of the map represents one bit of storage. Thus, the block mapping process 400 can map the file system blocks 512 to bit units 522 ("bits 522") in the map 520. As each unit 522 is one bit large in some embodiments, the map 520 can consume far less memory than the file system 510 and therefore can be an efficient way to store block status information. In certain embodiments, the map 520 can also be compressed to further reduce its storage impact.

In the depicted embodiment, the bits 522 in the map 520 include a '1' to represent active blocks 512 and a '0' to represent inactive blocks, including both deleted and zero blocks 512. Of course, the roles of the '1' and '0' characters can be reversed or other symbols can be used to represent active and inactive blocks. In another embodiment, a third symbol can be used to distinguish deleted and zero blocks 512. The bits 522 can be packed into bytes or octets so as to be addressable in most storage systems. In other embodiments, a single byte or other unit of storage can be used to represent each block 512.

Data structures other than maps can be used to store block 512 status information. For example, database tables, lists, arrays, or other structures can be used to store status information. Many other storage options will be apparent from this disclosure.

V. Example Restore Process

Figure 6:
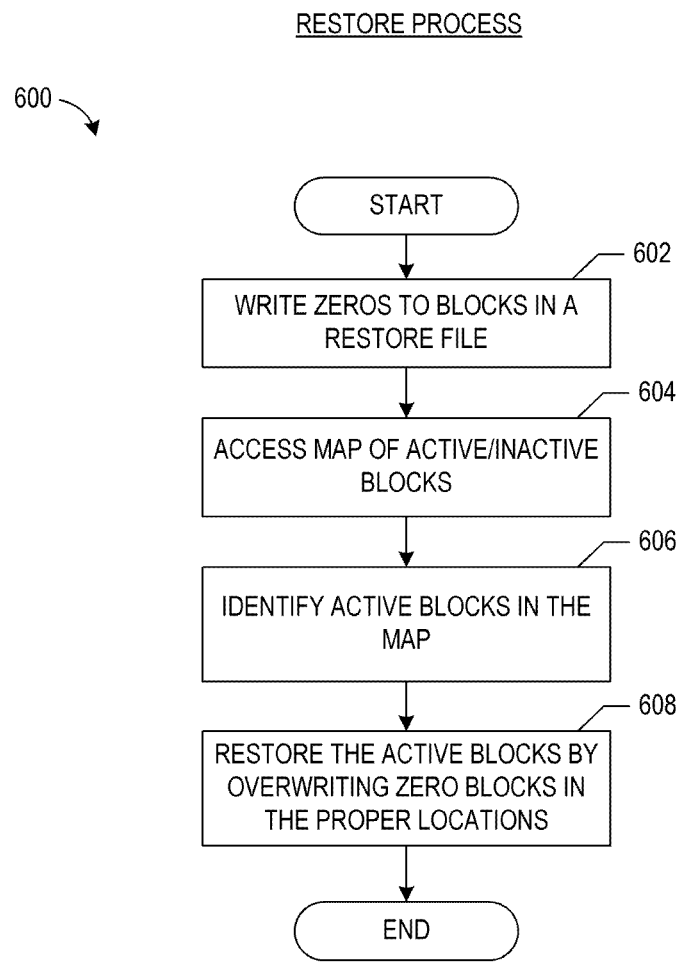
FIG. 6 illustrates an embodiment of a restore process.

FIG. 6 illustrates an embodiment of a restore process 600 for restoring a virtual machine image. Like the processes 300, 400 described above, the restore process 600 can be implemented by the systems 100 or 200. For example, the restore process 600 can be implemented by the management server 120, or more specifically, the backup module 222 of the management server 120. In certain embodiments, the backup module 222 accesses the virtual disk map 244 created by the mapping module 224 to rapidly restore the backup virtual disk file 242.

At state 602, zeros are written to blocks in a restore file to provide a clean file when restoring a virtual machine image. Advantageously, in certain embodiments, these zeros can be written at disk subsystem speeds and can be faster than restoring zero blocks over a network.

A map of active and inactive blocks is accessed at state 604, for example, from the backup server 140. Active blocks are identified in the map at state 606. The active blocks are then restored by overwriting the zero blocks in the proper locations at state 608. In certain embodiments, state 602 can be omitted from the restore process 600.

VI. Example Deduplication System

Figure 7:
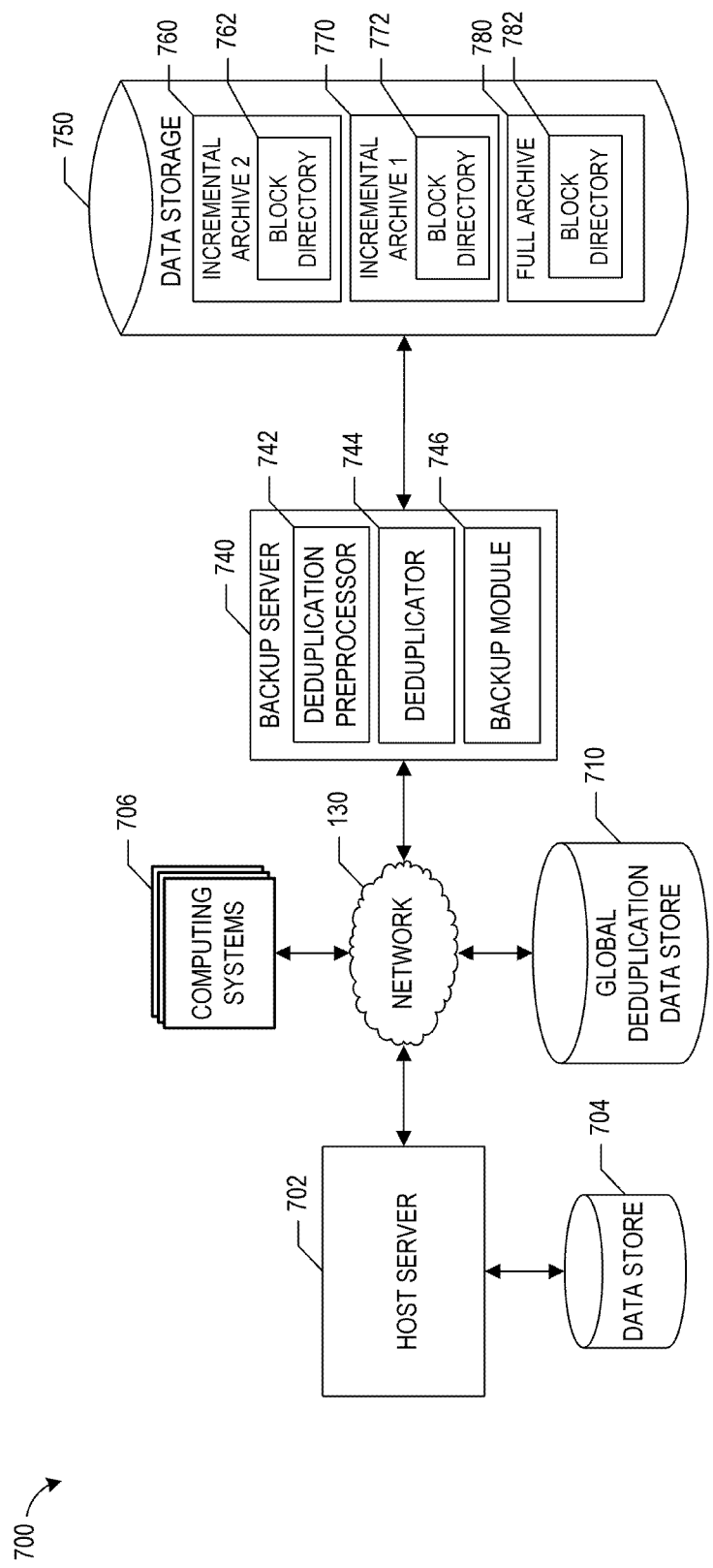
FIG. 7 illustrates an embodiment of a system for performing deduplication.

FIG. 7 illustrates an embodiment of a system 700 for performing deduplication. The deduplication system 700 provides a tool for backing up data without backing up a significant amount of previously backed-up data. As such, in certain embodiments, the deduplication system 700 can perform backups faster and with less-storage consumption than currently-available backup systems. Embodiments of the system 700 are usable with embodiments of the systems 100 and 200 described with reference to FIGS. 1 and 2, respectively.

As shown in FIG. 7, the deduplication system 700 can include a host server 702 in communication with a data store 704. The host server 702 can be used for any purpose and might be, for example, a web server, an application server, a database server, or the like. The host server 702 can also implement one or more virtual machines. In some embodiments, the host server 702 can include the host server 102, and some or all of the previously described embodiments with respect to the host server 102 may apply to the host server 702.

The data store 704 can be the data store that is to be backed up in this example. In certain embodiments, the host server 702 may include the data store 704. Alternatively, the data store 704 may be separate from the host server 702. In some embodiments, the data store 704 may include the data store 104, and some or all of the previously described embodiments with respect to the data store 104 may apply to the data store 704.

A backup server 740 can communicate with the host server 702 over a network 130 to perform backups of the data store. In some embodiments, the backup server 740 can include any system for backing up the data store 704 of the host server 702. Further, the backup server 740 can include any system that can deduplicate data either as a separate process or as part of the backup process. In some embodiments, the backup server 740 may include the backup server 140, and some or all of the previously described embodiments with respect to the backup server 140 may apply to the backup server 740. Further, in certain embodiments, the backup server 740 may include a management server (not shown), such as the management server 120, and some or all of the previously described embodiments with respect to the management server 120 may apply to the backup server 740.

A backup module 746 on the backup server 740 can perform the actual backups of the data store, saving backup sets in data storage 750. While the backup module 746 may perform any type of backup, full and incremental backup sets are shown in the depicted embodiment. In particular, the example data storage 750 shown includes a full backup archive 780 and two incremental backup archives 770 and 760. Many more backup datasets or archives may be included in an actual implementation, and more than one data storage 750 may be used.

The data storage 750 can include any type of storage system for storing backups of a data store 704. In some embodiments, the backup server 740 includes the data storage 750. Alternatively, the data storage 750 may be part of a separate system. Generally, the data store 704 and the data storage 750 are separate. However, in certain embodiments, the data storage 750 and the data store 704 may be part of a single system. For example, the data store 704 and the data storage 750 may be separate partitions, or separate storage devices that are included in a single system.

In particular embodiments, when creating backup files, the backup module 746 can identify blocks associated with data that has changed by, for example, comparing data in the data store 704 with data in one or more previous incremental or full backups. As a second example, the backup module 746 may identify changed blocks by looking at metadata that identifies changed data associated with the blocks. The backup module 746 can save these changed blocks as a new incremental backup.

In certain embodiments, the backup module 746 creates a fingerprint of each of the blocks in the incremental backup. Alternatively, the deduplicator 744 may create the fingerprints. This fingerprint can include any identifier that uniquely identifies the blocks in the incremental backup. For example, the fingerprint can be a checksum or the output of a hash function, such as MD5, SHA-512, or the like. In some embodiments, the backup module 746 saves the fingerprints in a block directory or a hash map in the incremental backup archive. This block directory can be a single directory for the entire data storage 750 or may be a set of block directories. For example, there may be one block directory for each full archive and one block directory for each incremental archive. As a second example, there may be a single block directory for the incremental archives combined and a single one for each full archive. In the depicted embodiment of FIG. 7, the full archive 780 and the incremental archives 770 and 760 each include a block directory 782, 772, and 762 respectively.

The backup server 740 can also include a deduplicator 744 and a deduplication preprocessor 742. The deduplicator 744 can deduplicate files or blocks of data, or portions of files or blocks of data to save storage space at, for example, the data storage 750. In general, deduplication can include identifying unchanged files or blocks of data that are stored in a previous backup, or elsewhere in the backup system 700, such as in a global deduplication data store 710, and removing or not storing the files or blocks of data in a current incremental archive or full archive. In certain embodiments, because the system 700 may be used to backup multiple computing systems, it is possible for a data block to not exist in a full archive of data store 704, but to exist in the global deduplication data store 710. For example, a data block associated with a file received by the host server 702 at some time after the most recent archive may be unlikely to be in the data storage 750; however, the data block may exist in the global deduplication data store 710. In certain embodiments, by not storing previously stored files or blocks of data, storage space is saved on the data storage 750 and/or the global deduplication data store 710.

In certain embodiments, deduplication can be performed in-line with an incremental backup process to save processing resources. Alternatively, deduplication can be performed before (e.g., pre-process deduplication) or after incremental backups are created (e.g., post-process deduplication). When deduplicating, the deduplicator 744 can generate a fingerprint, such as a checksum or hash, of the files or file portions (such as, e.g., blocks) in the data store 704.

In a number of embodiments, the deduplicator 744 can query a global deduplication data store 710 to determine whether a fingerprint exists in the global deduplication data store 710. The global deduplication data store 710 can include any storage system capable of storing a set of blocks and a set of associated fingerprints for one or more computing systems (e.g. the computing systems 706 and the data store 704), virtual machines, data stores, or the like. In certain embodiments, the global deduplication data store 710 stores a set of fingerprints for one or more data blocks that may be stored elsewhere. The global deduplication data store 710 may also include links to and/or addresses for locating the stored data blocks. In some embodiments, the global deduplication data store 710 may store the data blocks and the deduplicator 744 can generate a fingerprint for the stored data blocks when determining whether a particular data block exists at the global deduplication data store. In certain implementations, the global deduplication data store 710 is remote from the backup server 740 and may be accessed via the network 130. In other implementations, the global deduplication data store 710 can be local to the backup server 740.

The computing systems 706 can include any number and any type of computing systems. For example, the computing systems 706 can include additional host servers configured similarly to the host server 702, or configured differently. As a second example, the computing systems 706 can include a number of networked client systems, additional backup servers, and file servers, to name a few. Further, each of the computing systems 706 may be associated with one or more data stores.

In certain embodiments, the computing systems 706, as well as the remaining systems illustrated in FIG. 7, are associated with a single organization. Alternatively, some or all of the computing systems 706 may be associated with a different organization than the remaining systems illustrated in FIG. 7. For example, the backup server 740, the data storage 750, and the global deduplication data store 710 may be part of a cloud storage service.

If the deduplicator 744 determines that a fingerprint associated with a specific block exists in the global deduplication data store 710, the deduplicator 744 can mark the block with a placeholder instead of replicating the block in the new incremental backup archive. If the fingerprint is not in the global deduplication data store 710, the deduplicator can store the fingerprint in the global deduplication data store 710 and store the block in the new incremental backup archive.

Accessing the global deduplication store 710 can, in certain embodiments, be a computationally expensive process. This can particularly be the case when the global deduplication store 710 is shared among a large number of computing systems. Advantageously, in certain embodiments, the deduplication preprocessor 742 can reduce the number of queries made by the deduplicator 744 to the global deduplication data store 710. In one embodiment, the deduplication preprocessor 742 accesses the block directory of the previous incremental backup before the deduplicator 744 accesses the global deduplication data store 710. Accessing the block directory first allows the deduplication preprocessor 742 to determine whether a fingerprint for a particular block exists locally in the incremental archive. If the fingerprint exists for a particular block, in certain embodiments the deduplicator 744 can avoid making a query to the global deduplication data store 710 for that block, which may be relatively expensive in terms of computational or network resources.

In some embodiments, the deduplicator 744 can include the deduplication preprocessor 742 and/or the functionality of the deduplication preprocessor 742.

In some implementations, the backup server 740 can include a deduplication module (not shown) that can include the deduplication preprocessor 742 and/or the deduplicator 744, and/or the functionality of the deduplication preprocessor 742 and/or the deduplicator 744.

In certain embodiments, the deduplication preprocessor 742 may load the one or more block directories from the data storage 750 in memory associated with the backup server 740. Accesses to the block directory may therefore be significantly faster than queries through the network 130 to the global deduplication data store 710. Further, by accessing the block directory in addition to querying the global deduplication data store 710 when fingerprints are not present in the block directory, the system 700 performs what may be termed multitier or hybrid deduplication in various cases.

In certain embodiments, a difference between block-level incremental backups and block-level deduplication, as performed by the multitier deduplication system, is the scope of the block comparison. With block-level incremental backups, the system may compare blocks from a single source. In contrast, with block-level deduplication, the system can compare blocks from some or all previously backed-up data from one or more data stores and/or computing systems, storing unique blocks in the data storage 750 repository.

In a number of embodiments, the data blocks used in deduplication may differ in size from a file. Further, in certain embodiments, the size of a block used in deduplication may vary within a discrete range of block sizes. For example, the block sizes used by the deduplicator 744 may be selected from six, ten, or N available block sizes. The deduplicator 744 may select the block size to use based on any number of characteristics associated with a file or data to be backed up. These characteristics can include, for example, the size of the file, the frequency with which the file is modified, and/or the frequency with which a portion of a file is modified. In certain embodiments, the deduplicator 744 can select a block size, based at least in part on the above characteristics, to increase the frequency that a block may be shared among multiple files thereby decreasing the amount of storage space required to backup computing systems and data stores associated with the system 700.

In certain embodiments, other techniques can be used to reduce the amount of data processed by the deduplicator 744. For instance, the deduplication preprocessor 742 can use Change Block Tracking technology, provided by VMWARE, to identify zero blocks in the data store. The deduplicator 744 can skip these blocks, avoiding sending queries to the global deduplication data store 710. Similarly, the deduplication preprocessor 742 can perform active block mapping as has been previously described above to identify inactive blocks in the data store 704. The deduplicator 744 can skip the inactive blocks to further reduce queries to the global deduplication data store 710. Examples of active block mapping usable with embodiments of the system 700 are described in U.S. application Ser. No. 12/762,162, filed Apr. 16, 2010, titled "Block Status Mapping System for Reducing Virtual Machine Backup Storage," which is incorporated by reference in its entirety herein and forms a part of this specification.

VII. Example Deduplication Process

Figure 8:
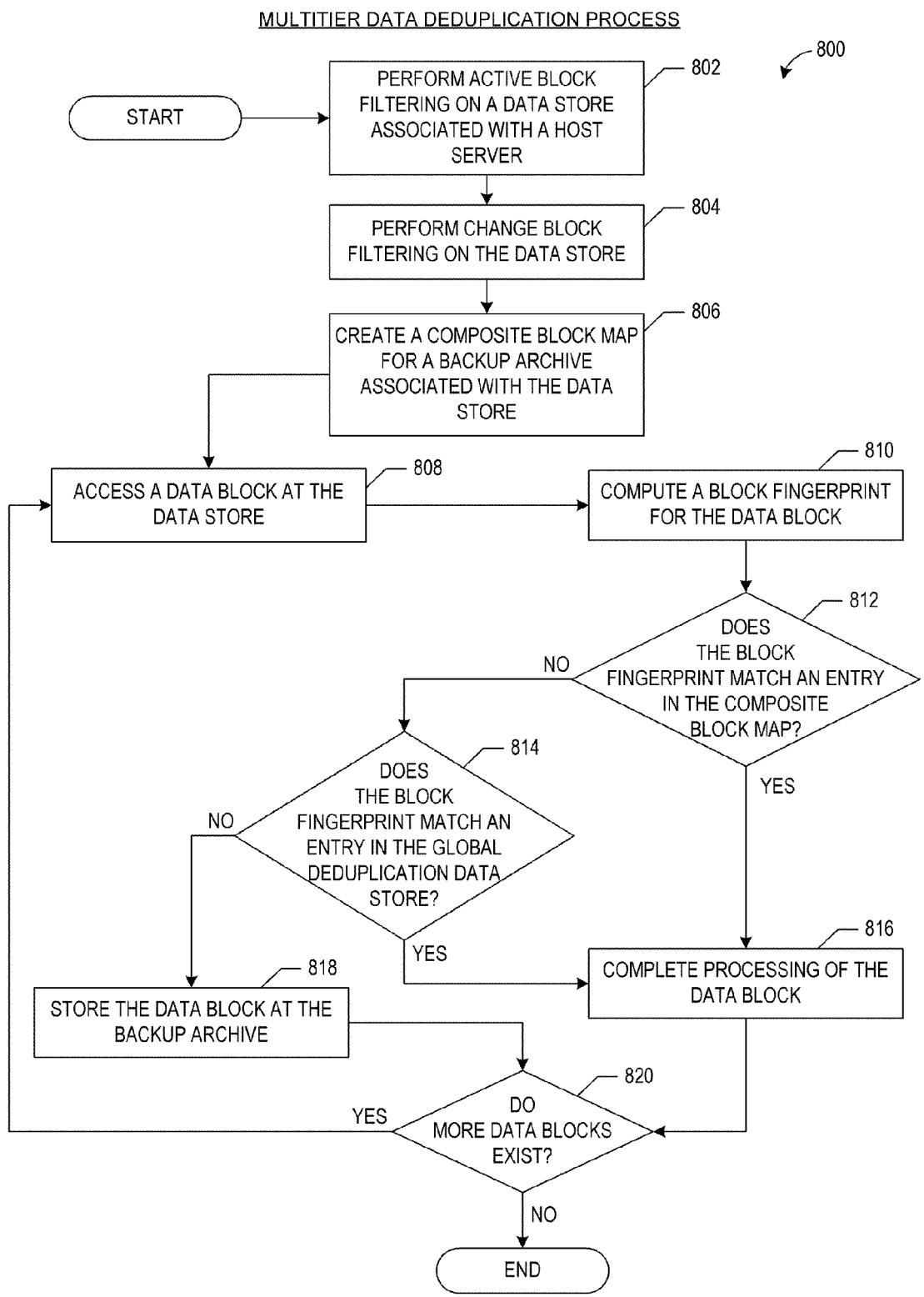
FIG. 8 illustrates an embodiment of a multitier data deduplication process.

FIG. 8 illustrates an embodiment of a multitier data deduplication process 800. In some embodiments, some or all of the process 800 can be performed as part of a backup process. In other embodiments, some or all of the process 800 can be used to store new data content while not storing previously stored data. For example, the process 800 can be used to store the content of a letter while not storing the letter head that may have been previously stored as part of another letter. In certain embodiments, the process 800 performs deduplication more efficiently than currently-available deduplication systems.

The process 800 can be implemented by the systems 100, 200, or 700 described above. For example, the process 800 can be implemented by the backup server 740, or more specifically, the deduplicator 744 and/or the deduplication preprocessor 742 of the backup server 740. As a second example, the process 800 can be implemented by the management server 120. To simplify discussion, and not to limit the disclosure, the process 800 will be described as being performed by the backup server 740 with respect to the data store 704.

At state 802, the backup server 740, for example, can perform active block filtering on a data store 704 associated with the host server 702. The active block filtering can include identifying blocks that are active or inactive and skipping any blocks that are inactive during execution of the remainder of the process 800. Examples of the process of mapping active and inactive blocks and selecting blocks to process further are described above with respect to FIG. 3 and FIG. 4. In certain embodiments, state 802 is optional.

At state 804, the backup server 740 can perform change block filtering using, for example, Change Block Tracking technology to identify blocks that have changed since a previous backup. In certain embodiments, state 804 is optional. In a number of embodiments, any type of filtering that can reduce the number of data blocks to be examined for backup and/or deduplication can be performed as part of state 802 or 804.

At state 806, the backup server 740 can create a composite block map for a backup archive, such as the data storage 750, associated with the data store 704. The composite block can include fingerprints of each data block stored at the data storage 750. As previously described, these fingerprints may include, for example, a checksum or a hash of the data block. The composite block map can be based at least in part on the block directories associated with one or more archives stored at the data storage 750. In certain embodiments, to create the composite block map, the backup server 740 accesses the block directory of the most recent archive (e.g. incremental archive 760) and creates a map based on the block directory contents. The backup server 740 can access each previous archive to add the contents of the block directory associated with each archive to the map. Although described as a map, in certain embodiments, the composite block map can include any type of data structure that can store the relationship between fingerprints and data blocks.

At state 808, the backup server 740 can access a data block at the data store 704. In certain embodiments, the data block is one of a set of data blocks to be backed up. Alternatively, the data block may be smaller than a block to be backed up. For example, a block of size N may be selected for backup; however, the process 800 may be performed on a more granular level. Thus, the backup server 740 may divide the block of size N into two pieces and perform some or all of the process 800 on two blocks of size N/2.

At state 810, the backup server 740 can compute a block fingerprint for the data block. At decision state 812, the backup server 740 determines if the block fingerprint matches an entry in the composite block map. If the block fingerprint does not exist in the composite block map, the backup server can determine at decision state 814 whether the block fingerprint matches an entry in the global deduplication data store 710.

If the backup server 740 determines that the block fingerprint exists in the composite block map (decision state 812) or the global deduplication data store (decision state 814), then the backup server 740 completes processing of the data block at state 816. In certain embodiments, state 816 may include skipping the data block. In some embodiments, state 816 may include updating one or more data maps to point to the storage location of the data block. In some embodiments, state 816 may include touching the data block to update a timestamp associated with the data block. In some embodiments, block 816 may include deleting the data block or replacing the data block with a pointer to the data block identified in the composite block map or the global deduplication data store 710.

If the backup server 740 determines that the block fingerprint does not exist in the composite block map (decision state 812) or the global deduplication data store (decision state 814), then, at state 818, the backup server 740 stores the data block at the backup archive (e.g. the data storage 750). In certain embodiments, the backup server 740 may store the data block as part of a new incremental archive or a new full archive.

At decision state 820, the backup server 740 can determine if more data blocks exist. This may include determining if more data blocks identified for archival or backup storage exist. If more data blocks identified for processing do exist, process 800 accesses the next identified data block at state 808 and the process 80 continues executing as previously described.

In a number of embodiments, the backup server 740 stores the data blocks of the data store at the backup archive before performing deduplication. In some such embodiments, at state 816, the backup server 740 can remove the data block from the backup archive and at state 818 the backup server 740 can confirm storage of the data block at the backup archive.

In certain embodiments, the process 800 can be used with file-based backup systems. In some implementations, the process 800 can be used with image-based backup systems. The image-based backup systems can backup an image of a virtual machine file or of a portion of a virtual machine file (e.g. a differential copy storing changes relative to a previous snapshot of the virtual machine file). The backup server 740 can generate a searchable index or catalog for each virtual image being backed up by, for example, examining a MFT associated with each virtual image to obtain metadata associated with the virtual image. The searchable index can be stored as part of the backup archive. Advantageously in certain embodiments, storing the searchable index enables a user to search for files in an archive associated with a virtual image without loading a number of archived virtual images to locate the archive that includes the file sought by the user. Image-based backup and cataloging are described in greater detail in U.S. application Ser. No. 13/156,199, filed Jun. 8, 2011, titled "Cataloging System for Image-Based Backup," which is incorporated by reference in its entirety herein and forms a part of this specification.

VIII. A Second Example Deduplication Process

Figure 9:
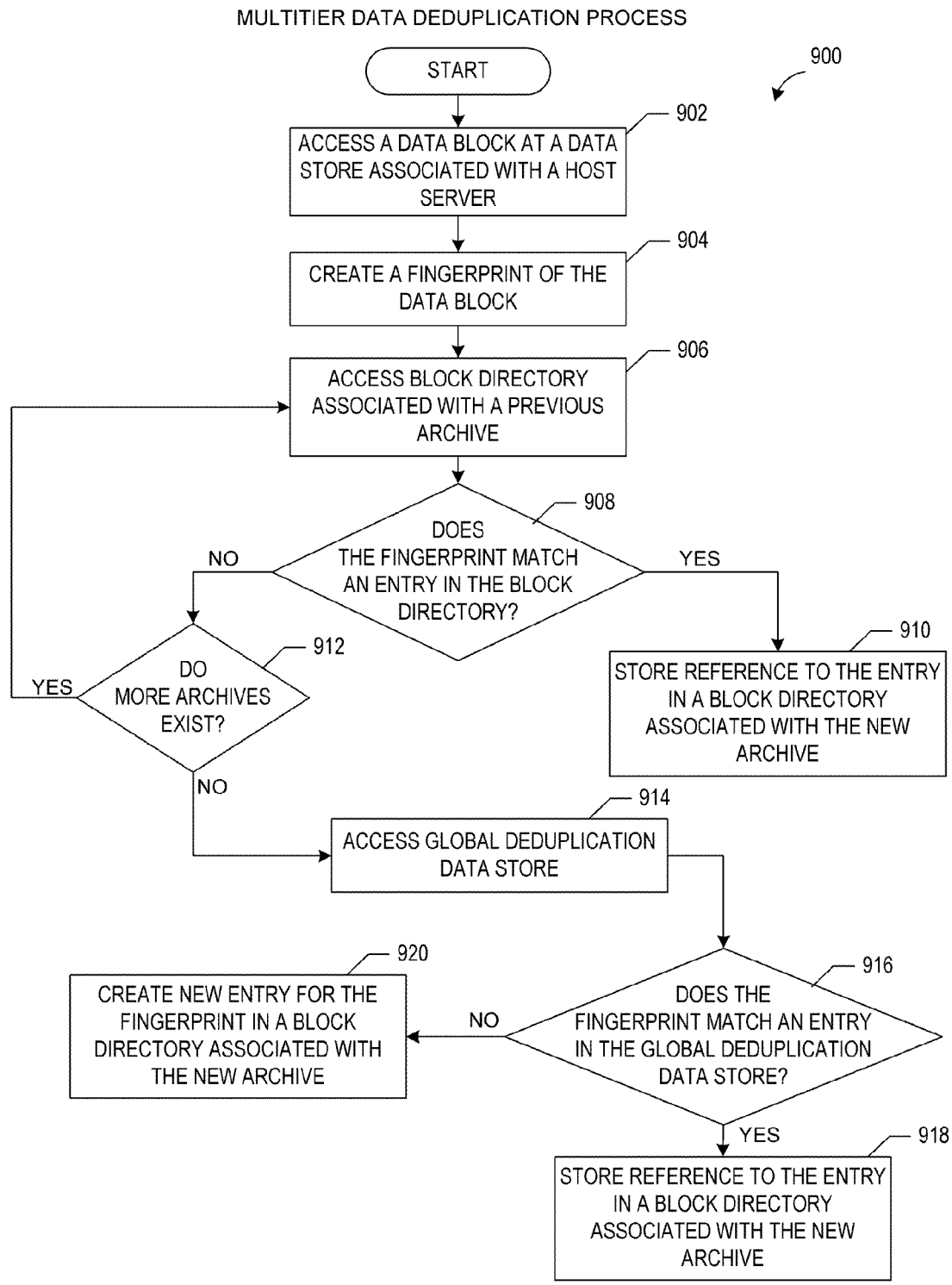
FIG. 9 illustrates another embodiment of a multitier data deduplication process.

FIG. 9 illustrates another embodiment of a multitier data deduplication process 900. In some embodiments, some or all of the process 900 can be performed as part of a backup process. In other embodiments, some or all of the process 900 can be used to store new data content while not storing previously stored data. For example, the process 900 can be used to store the content of a letter while not storing the letter head that may have been previously stored as part of another letter. In certain embodiments, the process 900 performs deduplication more efficiently than currently-available deduplication systems.

The process 900 can be implemented by the systems 100, 200, or 700 described above. For example, the process 900 can be implemented by the backup server 740, or more specifically, the deduplicator 744 and the deduplication preprocessor 742 of the backup server 740. As a second example, the process 900 can be implemented by the management server 120. To simplify discussion, and not to limit the disclosure, the process 900 will be described as being performed by the backup server 740 with respect to the data store 704.

At state 902, the backup server 740, for example, can access a data block at a data store 704 associated with a host server 702. The data block, in certain embodiments, may be part of a file that is being backed up. The backup server 740, at state 904, creates a fingerprint, such as a hash, of the data block. At state 906, the backup server 740 accesses a block directory associated with a previous archive, such as the incremental archive 760 at a data storage 750, which may include archives of the data store 704. This previous archive can be an incremental archive or a full archive.

At decision state 908, the backup server 740 determines whether the fingerprint matches an entry in the block directory. In some embodiments, decision state 908 can include comparing the fingerprint to one or more fingerprints associated with the entries in the block directory. In other embodiments, decision state 908 can include identifying blocks stored in the incremental archive 760 based on the entries in the block directory, creating fingerprints for the identified blocks and comparing the fingerprint to the fingerprints associated with the entries in the block directory.

If the fingerprint matches an entry in the block directory, the backup server 740, at state 910, can store a reference to the entry in a block directory associated with a new archive, which can be an incremental archive or a full archive. Alternatively or in addition, the backup server 740 may store a reference to the storage location of the data block. In some embodiments, the reference is stored in the new archive in addition to or instead of in the block directory.

If the fingerprint does not match an entry in the block directory, the backup server determines if more archives exist at decision state 912. If so, the process 900 returns to state 906. In certain embodiments, the backup server 740 can access the archive in chronological or reverse chronological order of creation. In some embodiments, the access order of the archives can be based, at least in part, on whether the archive is an incremental archive or a full archive. If no more archives exist at the data storage 750, the backup server 740 accesses the global deduplication data store at state 914.

At decision state 916, the backup server 740 determines whether the fingerprint matches an entry in the global deduplication data store 710. If so, the backup server 740 stores a reference to the entry in the global deduplication data store 710 in a block directory associated with the new archive at state 918. If the fingerprint does not match an entry in the global deduplication data store 710, the backup server 740 can create a new entry for the fingerprint in a block directory associated with a new archive at state 920. In some embodiments, state 920 can include storing the data block in the new archive. In certain embodiments, state 920 can also include creating a pointer from the block directory entry associated with the data to the location of the data in the new archive.

IX. Terminology

For purposes of illustration, certain aspects, advantages and novel features of various embodiments of the inventions have been described herein. It is to be understood that not necessarily all such advantages may be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein. Further, no element, feature, block, or step, or group of elements, features, blocks, or steps, are necessary or indispensable to each embodiment. Additionally, all possible combinations, subcombinations, and rearrangements of systems, methods, features, elements, modules, blocks, and so forth are within the scope of this disclosure.

Depending on the embodiment, certain acts, events, or functions of any of the algorithms, methods, or processes described herein can be performed in a different sequence, can be added, merged, or left out all together (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, processes, methods, and algorithms described in connection with the embodiments disclosed herein can be implemented as electronic hardware, computer software, or combinations of both. To clearly illustrate this interchangeability of hardware and software, various illustrative components, blocks, modules, operations, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The blocks, operations, or steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of volatile or non-volatile computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for deduplicating a backup archive, the system comprising:
   a computer system comprising computer hardware, the computer system programmed to implement:
   a deduplication module configured to:
   access one or more block directories associated with one or more backup archives at an archive data store, wherein the one or more block directories include fingerprints of data blocks associated with the one or more backup archives, and wherein at least one of the one or more backup archives is associated with a data store;
   create a composite block map based at least in part on the one or more block directories, wherein the composite block map includes fingerprints of each data block stored at the archive data store; and
   access one or more data blocks from the data store and for each of the one or more data blocks, the deduplication module is further configured to:

create a fingerprint for the data block;
determine whether the fingerprint exists in the composite block map of the archive data store;
in response to determining that the fingerprint does not exist in the composite block map, determine whether the fingerprint exists in a global deduplication data store, wherein the global deduplication data store is separate from the archive data store and the composite block map; and
in response to determining that the fingerprint does not exist in the global deduplication data store, identify the data block for backup storage; and
a backup module configured to:
backup each of the data blocks identified for backup storage as a target archive at the archive data store; and
store the fingerprint associated with each of the data blocks identified for backup storage at a target block directory associated with the target archive.

2. The system of claim 1, wherein the fingerprint includes one or more of a checksum and a hash.

3. The system of claim 1, wherein the one or more backup archives or the target archive include one or more of a full archive, an incremental archive, and a differential archive.

4. The system of claim 1, wherein the deduplication module is further configured to:
create a map of the active and the inactive data blocks of the one or more data blocks from the data store; and
access the data blocks identified as active in the map and to not access the data blocks identified as inactive in the map.

5. The system of claim 1, wherein at least one of the one or more data blocks is associated with a virtual machine file.

6. The system of claim 1, in response to determining that the fingerprint exists in the composite block map, the deduplication module is further configured to update the target block directory to point to the location of the block associated with the fingerprint at the archive data store.

7. The system of claim 1, in response to determining that the fingerprint exists in the global deduplication data store, the deduplication module is further configured to update the target block directory to point to the location of the block associated with the fingerprint at the global deduplication data store.

8. The system of claim 1, wherein the backup module is further configured to:
remove each data block from the target archive not identified for backup storage by the deduplication module, and
remove each fingerprint from the target block directory associated with each removed data block.

9. A method of deduplicating a backup archive, the method comprising:
by a computer system comprising computer hardware:
accessing one or more block directories associated with one or more archives at an archive data store, wherein the one or more block directories include fingerprints of data blocks associated with the one or more archives, and wherein at least one of the one or more archives is associated with a data store;
creating a composite block map based at least in part on the one or more block directories, wherein the composite block map includes fingerprints of each data block stored at the archive data store; and
accessing one or more data blocks from the data store and for each of the one or more data blocks:
creating a fingerprint for the data block;
determining whether the fingerprint exists in the composite block map of the archive data store;
in response to determining that the fingerprint does not exist in the composite block map, determining whether the fingerprint exists in a global deduplication data store, wherein the global deduplication data store is separate from the archive data store and the composite block map;
in response to determining that the fingerprint does not exist in the global deduplication data store, backing up the data block as part of a target archive at the archive data store; and
storing the fingerprint associated with the data block storage at a target block directory associated with the target archive.

10. The method of claim 9, further comprising:
creating a map of the active and the inactive data blocks of the one or more data blocks from the data store, and
accessing the data blocks identified as active in the map while not accessing the data blocks identified as inactive in the map.

11. The method of claim 9, wherein in response to determining that the fingerprint exists in the composite block map, the method further comprises updating the target block directory to point to the location of the block associated with the fingerprint at the archive data store.

12. The method of claim 9, wherein in response to determining that the fingerprint exists in the global deduplication data store, the method further comprises updating the target block directory to point to the location of the block associated with the fingerprint at the global deduplication data store.

13. The method of claim 9, wherein in response to determining that the fingerprint exists in the composite block map, the method further comprises:
removing the data block from the target archive, and
removing the fingerprint from the target block directory.

14. The method of claim 9, wherein in response to determining that the fingerprint exists in the global deduplication data store, the method further comprises:
removing the data block from the target archive, and
removing the fingerprint from the target block directory.

15. A non-transitory computer-readable storage medium comprising computer-executable instructions configured to implement a method of deduplicating a backup archive, the method comprising:
accessing one or more block directories associated with one or more archives at a first archive data store, wherein the one or more block directories include fingerprints of data blocks associated with the one or more archives, and wherein at least one of the one or more archives is associated with a data store;
creating a composite block map based at least in part on the one or more block directories, wherein the composite block map includes fingerprints of each data block stored at the first archive data store; and
accessing one or more data blocks from the data store and for each of the one or more data blocks:
creating a fingerprint for the data block;
determining whether the fingerprint exists in the composite block map of the first archive data store;
in response to determining that the fingerprint does not exist in the composite block map, determining whether the fingerprint exists in a second archive data store, wherein the second archive data store is separate from the first archive data store and the composite block map;

in response to determining that the fingerprint does not exist in the second archive data store, backing up the data block as part of a target archive at the first archive data store; and storing the fingerprint associated with the data block storage at a target block directory associated with the target archive.

16. The non-transitory computer-readable storage medium of claim 15, wherein the method further comprises:

creating a map of the active and the inactive data blocks of the one or more data blocks from the data store, and accessing the data blocks identified as active in the map while not accessing the data blocks identified as inactive in the map.

17. The non-transitory computer-readable storage medium of claim 15, wherein in response to determining that the fingerprint exists in the composite block map, the method further comprises updating the target block directory to point to the location of the block associated with the fingerprint at the first archive data store.

18. The non-transitory computer-readable storage medium of claim 15, wherein in response to determining that the fingerprint exists in the second archive data store, the method further comprises updating the target block directory to point to the location of the block associated with the fingerprint at the second archive data store.

19. The non-transitory computer-readable storage medium of claim 15, wherein in response to determining that the fingerprint exists in the composite block map, the method further comprises:

removing the data block from the target archive, and removing the fingerprint from the target block directory.

20. The non-transitory computer-readable storage medium of claim 15, wherein in response to determining that the fingerprint exists in the second archive data store, the method further comprises:

removing the data block from the target archive, and removing the fingerprint from the target block directory.

* * * * *